(12) United States Patent
Fiedler

(10) Patent No.: US 9,096,148 B2
(45) Date of Patent: Aug. 4, 2015

(54) FASTENING ARRANGEMENT

(75) Inventor: Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 331 days.

(21) Appl. No.: 13/522,418

(22) PCT Filed: Feb. 2, 2011

(86) PCT No.: PCT/EP2011/051475
§ 371 (c)(1),
(2), (4) Date: Jul. 16, 2012

(87) PCT Pub. No.: WO2011/095515
PCT Pub. Date: Aug. 11, 2011

(65) Prior Publication Data
US 2012/0291227 A1 Nov. 22, 2012

(30) Foreign Application Priority Data
Feb. 3, 2010 (DE) .................. 10 2010 006 827

(51) Int. Cl.
| A44B 17/00 | (2006.01) |
| B60R 11/00 | (2006.01) |
| G09F 3/00 | (2006.01) |
| H01F 7/02 | (2006.01) |
| B60N 3/04 | (2006.01) |
| A42B 3/04 | (2006.01) |
| A42B 3/22 | (2006.01) |
| F16B 1/00 | (2006.01) |
| F16B 5/12 | (2006.01) |
| F16B 21/18 | (2006.01) |

(52) U.S. Cl.
CPC . *B60N 3/046* (2013.01); *A42B 3/04* (2013.01); *A42B 3/22* (2013.01); *F16B 1/0071* (2013.01); *F16B 5/12* (2013.01); *F16B 21/186* (2013.01); *F16B 2001/0035* (2013.01); *Y10T 24/1371* (2015.01); *Y10T 24/32* (2015.01); *Y10T 24/45984* (2015.01)

(58) Field of Classification Search
USPC ......... 24/666, 667, 664, 303; 16/8, 9, 16, 4, 5
See application file for complete search history.

(56) References Cited

U.S. PATENT DOCUMENTS 677,130 A * 6/1901 Hatfield et al. .................. 24/630
3,808,647 A * 5/1974 Febrer ............................. 24/108
(Continued)

FOREIGN PATENT DOCUMENTS

CN 101628551 A 1/2010
DE 20021104 U1 4/2001
(Continued)

*Primary Examiner* — Robert J Sandy
*Assistant Examiner* — Rowland Do
(74) *Attorney, Agent, or Firm* — The Webb Law Firm

(57) ABSTRACT

A fastening arrangement for fastening a flexible element to a rigid element is provided. The fastening arrangement comprising a first closure element and a second closure element, which each consist of a plug part, a housing part and a catch. Each closure element is closed in that the plug part is put together with the housing part in a closing direction until snapping into place in a closed position, so that the plug part and the housing part are held at each other against the closing direction. Each housing part is formed such that by means of a relative movement of the housing part relative to the plug part in an opening direction, which differs from the closing direction, the plug part is pushed out of the catch and the closure element hence can be opened.

21 Claims, 17 Drawing Sheets

(56) References Cited

U.S. PATENT DOCUMENTS

| | | | |
|---|---|---|---|
| 7,204,002 B2 * | 4/2007 | Kaneko et al. | 24/614 |
| 2009/0126059 A1 | 5/2009 | Tack et al. | |
| 2010/0308605 A1 | 12/2010 | Fiedler | |

FOREIGN PATENT DOCUMENTS

| | | |
|---|---|---|
| DE | 19954857 A1 | 5/2001 |
| EP | 2062489 A2 | 5/2009 |
| WO | 0136227 A2 | 5/2001 |
| WO | 2008006354 A2 | 1/2008 |
| WO | 2008006356 A2 | 1/2008 |
| WO | 2008006357 A2 | 1/2008 |
| WO | 2009010049 A2 | 1/2009 |
| WO | 2009012796 A1 | 1/2009 |
| WO | 2009092368 A2 | 7/2009 |
| WO | 2009127196 A2 | 10/2009 |
| WO | 2010006594 A2 | 1/2010 |

\* cited by examiner

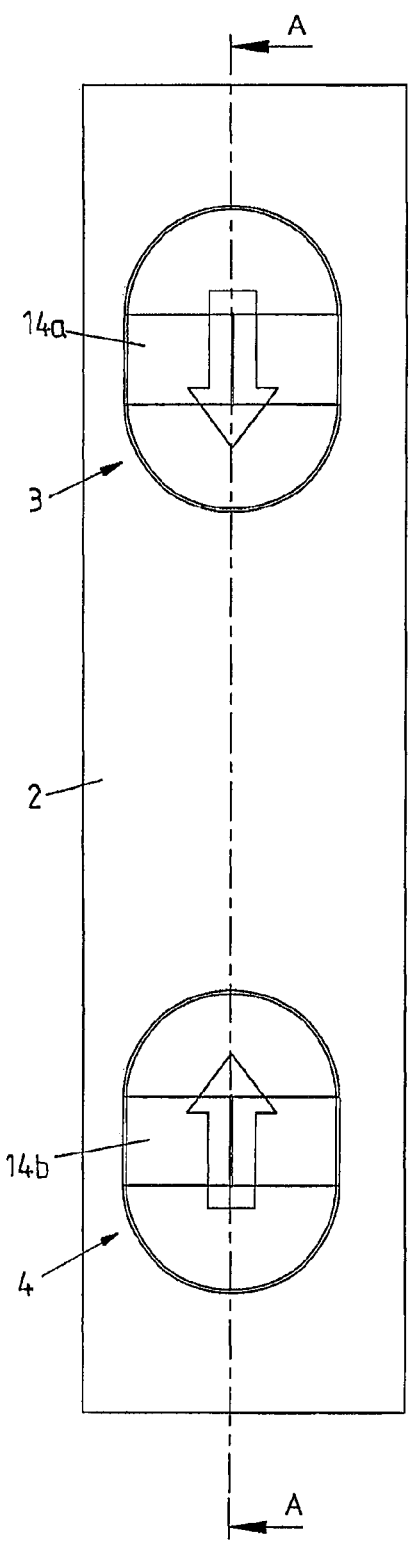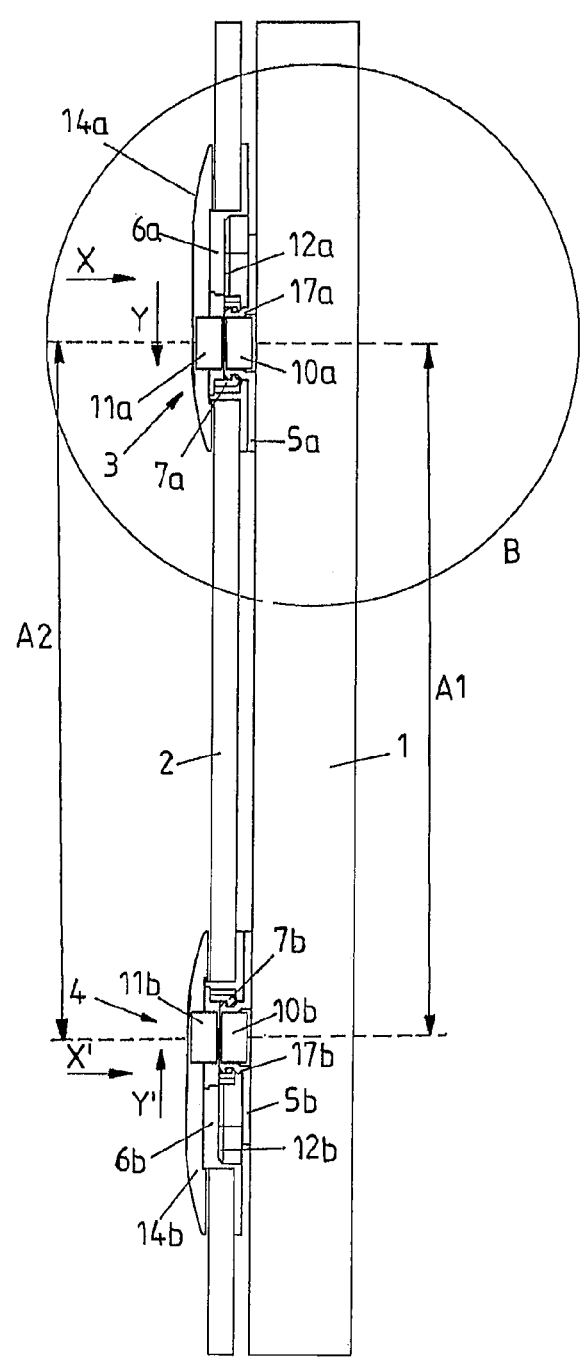

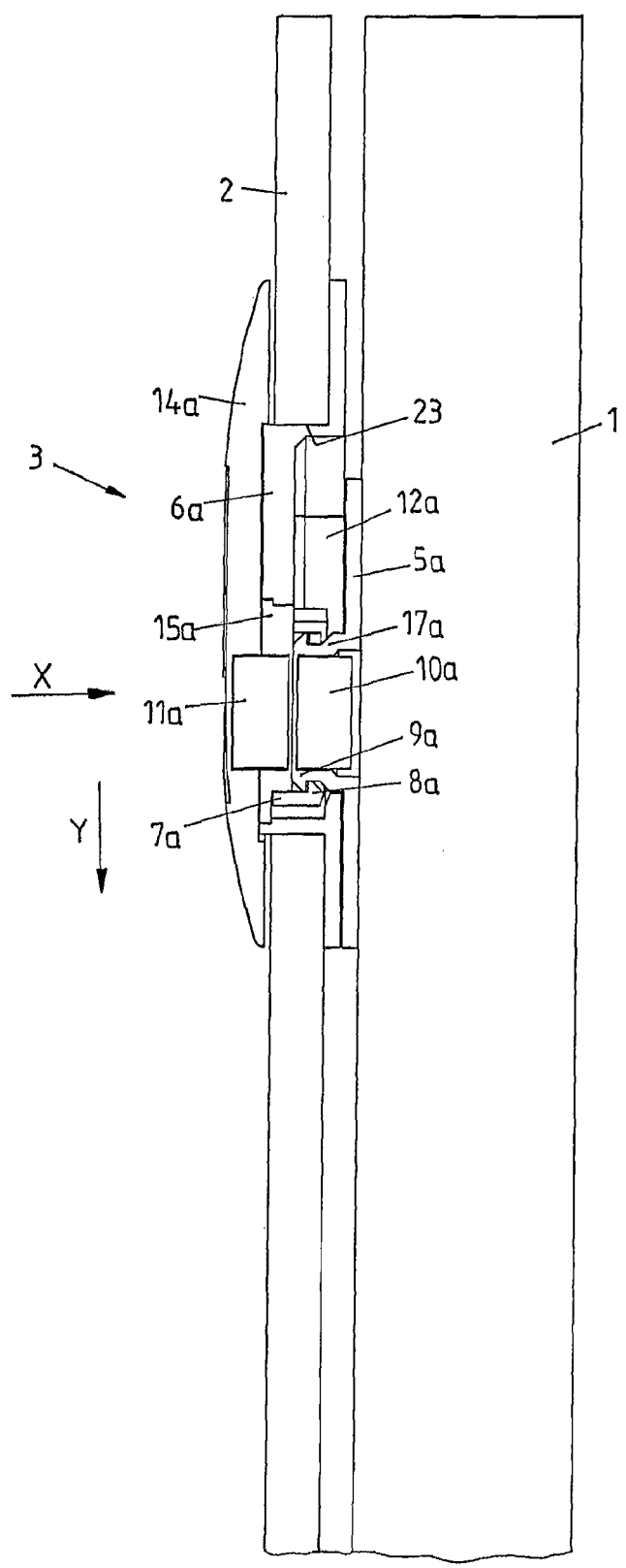

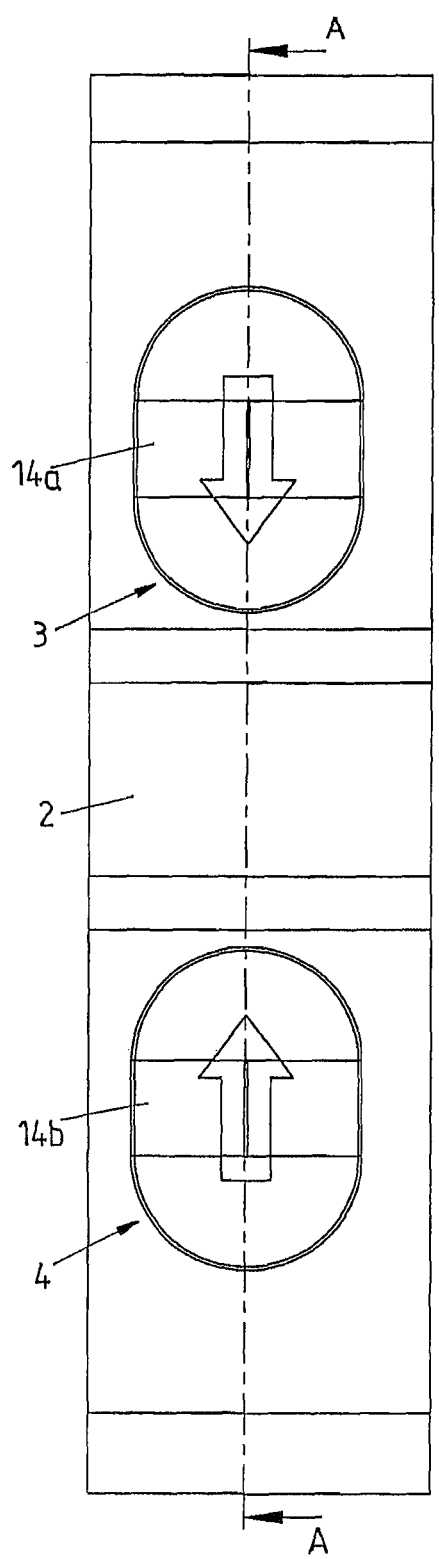
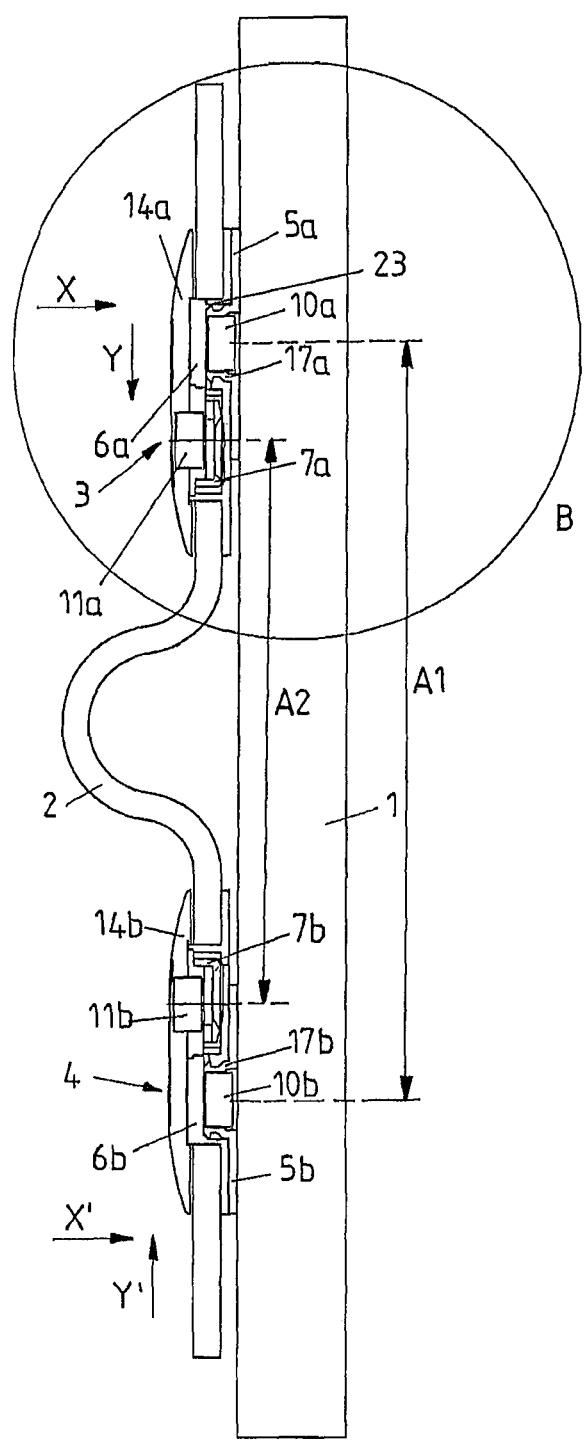

FIG 3B
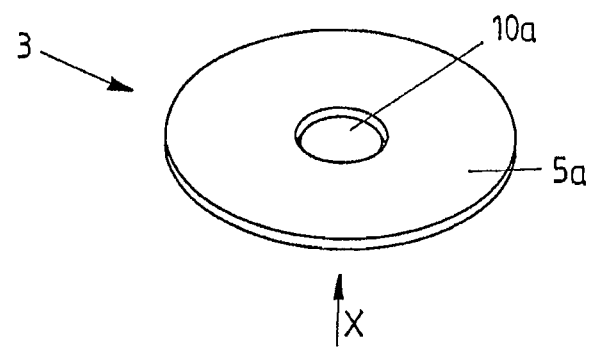
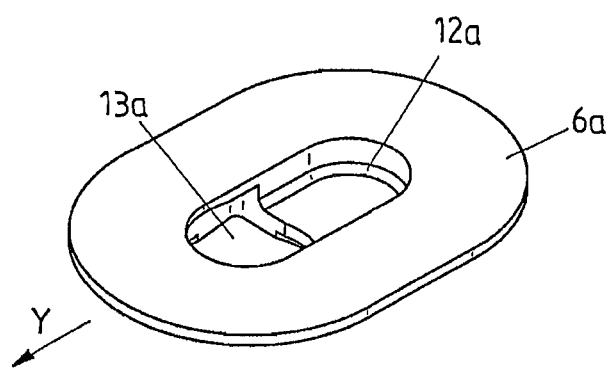
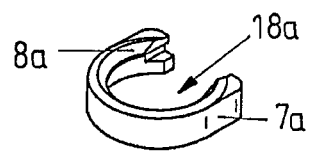
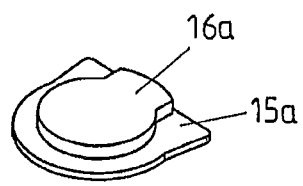
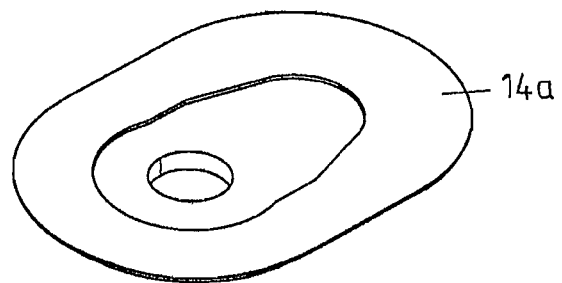

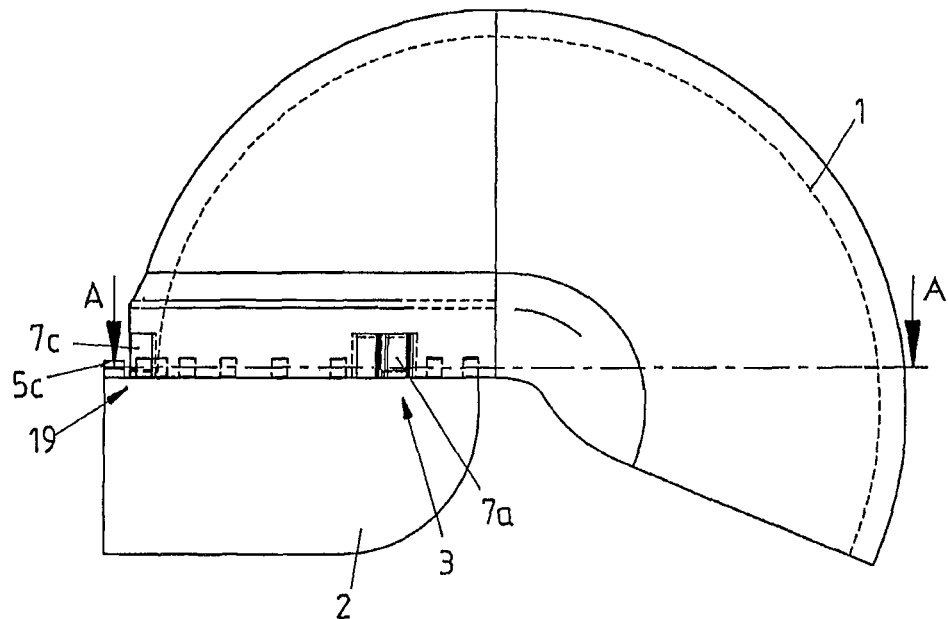
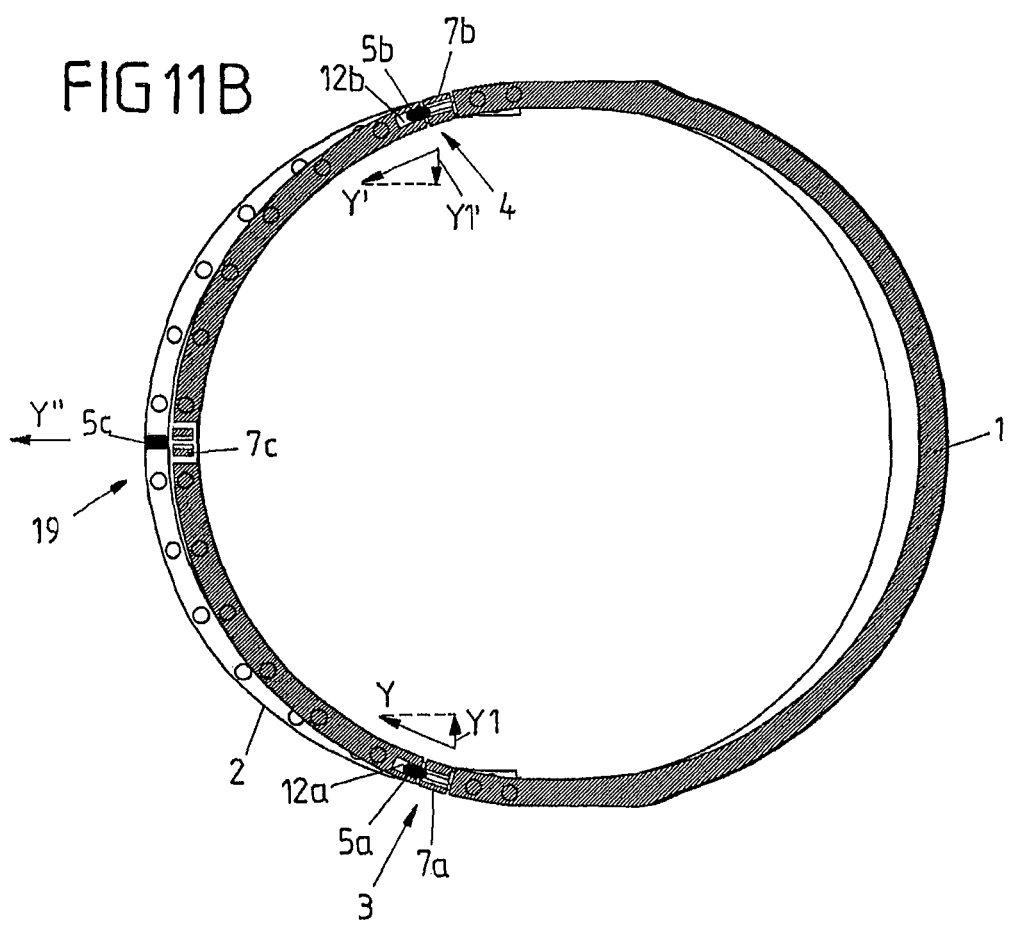

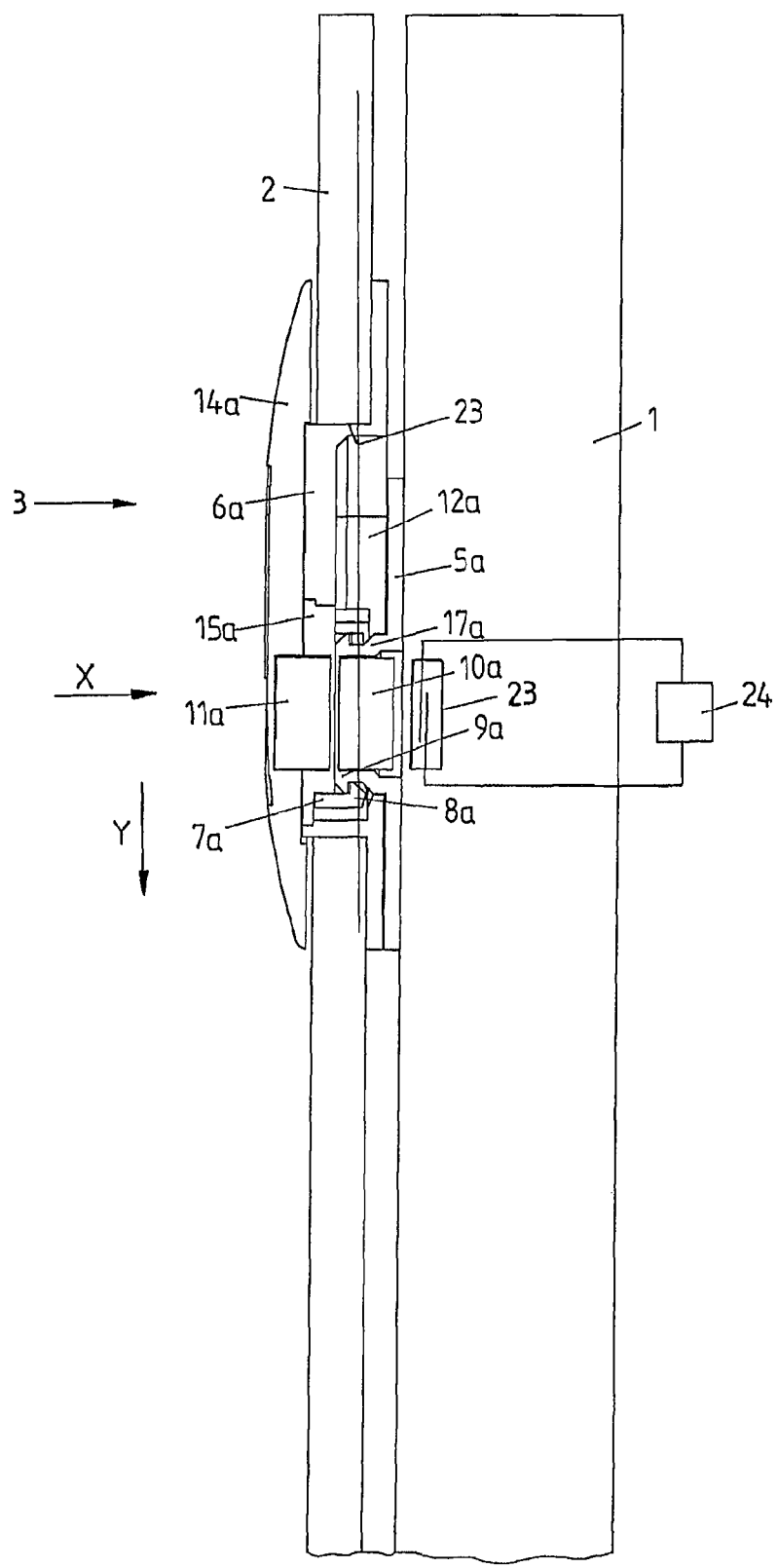

FASTENING ARRANGEMENT

CROSS-REFERENCE TO A RELATED APPLICATION

This application is a National Phase Patent Application of International Patent Application Number PCT/EP2011/051475 filed on Feb. 2, 2011 which claims priority of German Patent Application Number 10 2010 006 827.6, filed on Feb. 3, 2010.

BACKGROUND OF THE INVENTION

The invention relates to a fastening arrangement for fastening a flexible element to a rigid element.

Such fastening arrangement includes a first closure element and a second closure element, which each consist of a plug part, a housing part and a catch. Each closure element is closed in that the plug part and the housing part are put together in a closing direction until snapping into place in a closed position and in the closed position are then held at each other by the catch against the closing direction. Each housing part is formed such that by means of a relative movement of the housing part relative to the plug part in an opening direction, which differs from the closing direction, the plug part is pushed out of the catch and the closure element hence can be opened. The plug part of the first closure element and the plug part of the second closure element are firmly arranged on the one of the rigid element and the flexible element, and the housing part of the first closure element and the housing part of the second closure element is firmly arranged on the other one of the rigid element and the flexible element.

The flexible element to be fastened by means of the fastening arrangement for example can constitute a floor mat which is to be arranged and to be fastened on a vehicle floor realizing a rigid element.

A floor mat conventionally is fastened on a vehicle floor by two pushbutton-like fastening means, so that the floor mat is secured against slipping. The pushbutton-like fastening means are closed by pressing and opened again by pulling. With such type of fastening it can occur, however, that the user inserts the floor mat carelessly and the fastening means do not or at least not completely get in engagement. It can also occur that e.g. in case of a crash or a strong foot movement the mat is torn out of the fastening means. In the worst case, both can lead to the fact that a floor mat for a driver seat slips under the accelerator or brake pedal of the vehicle and blocks the accelerator or brake pedal, so that the vehicle no longer is controllable.

SUMMARY OF THE INVENTION

It is the object underlying the present invention to create a fastening arrangement which provides for a rather safe fastening of a flexible element to a rigid element by means of a plurality of closure elements and for a simple release of the flexible element from the rigid element.

Each closure element consists of a plug part and a housing part and a catch between plug and housing. Each closure element is closed in that the plug is put together with the housing part in a closing direction until snapping into place in a closed position. Plug and housing then are inseparable opposite to the closing direction (the locking engagement hence can only be released by destroying the locking engagement by a movement opposite to the closing direction; alternatively, the locking engagement possibly can also be designed such that releasing opposite to the closing direction is possible without destruction by applying a (misuse) force). The housing part is formed such that by means of a relative movement of the housing part relative to the plug part in an opening direction, which differs from the closing direction, the plug part is laterally pushed out of the catch and hence can be opened.

Furthermore, the at least two plug parts of at least two closure elements are firmly arranged on the one of the rigid element and the flexible element and the housing parts are firmly arranged on the other one of the rigid element and the flexible element.

The housings are arranged such that the opening directions of the two closure elements are directed against each other with at least one direction component. In addition, the opening directions are arranged such that on opening the flexible element is bent between the two housing parts. In the non-bent condition of the flexible element, the housing parts are spaced such that they lie opposite the plug parts arranged on the rigid element and snap into place with the same by moving in the closing direction. In the bent condition, the plug parts are laterally shifted out of the catch.

In the present case, the fact that the closing direction differs from the opening direction in particular can mean that the closing direction and the opening direction are not directed parallel and not antiparallel either (i.e. not opposite to each other). The opening direction for example can be directed vertical or at an oblique angle to the closing direction.

In the present case, direction component is understood to be a vector component of the opening direction in the case of a vector splitting of the vector of the opening direction. The fact that the opening directions of the two closure elements are directed against each other with at least one direction component then should mean that the opening direction of the first closure element has a direction (vector) component which is directed antiparallel to a direction (vector) component of the opening direction of the second closure element.

The non-bent condition of the flexible element is understood to be a condition in which the flexible element is in a proper position of normal use. This includes the fact that the flexible element has a curved shape in its position of normal use. The bent condition then corresponds to a condition in which the flexible element is bent out of its curved position of normal use. If the flexible element is designed elastic, the flexible element is relaxed in the non-bent condition, i.e. not tensioned elastically.

In accordance with an exemplary embodiment of the invention, the fastening arrangement can be released for separating the flexible element from the rigid element, in that the housing parts of the closure elements of the fastening arrangement each are moved relative to the plug parts of the closure elements in the opening direction associated to a respective closure element. Due to the fact that the opening direction associated to the first closure element is directed other than the opening direction associated to the second closure element, opening of the fastening arrangement (by shifting the housing parts of the closure elements relative to the associated plug parts) only is possible by deforming the flexible element and thus can only be performed in a conscious way, so that unintentional opening is not possible or at least only with difficulty.

The two opening directions of the closure elements for example can be directed towards each other with one direction component. By deforming the flexible element, the housing parts then are moved relative to the plug parts, so that the housing parts are brought out of engagement with the plug parts and the fastening arrangement is opened.

When the flexible element for example is formed by a floor mat of a vehicle, the housing parts can be arranged on the floor mat realizing a flexible element and the plug parts can be arranged on a vehicle floor realizing a rigid element. By lifting the floor mat and thereby moving the housing parts towards each other such that the plug parts slide out of the catch at the housing part, the fastening of the floor mat to the vehicle floor can be released and the floor mat can be removed.

Releasing the flexible element hence can be effected in a simple way, wherein at the same time a safe fastening is ensured in the closed position of the closure elements and the risk of an unintentional release of the flexible element from the rigid element is reduced.

At the same time, the fastening arrangement can also be transferred into its closed position in a simple way, in that the closure elements are closed by attaching the housing part and the plug part to each other in the closing direction and by thereby locking the plug part into place with the catch.

The fastening arrangement with its closure elements can be formed purely mechanically, in that for closing purposes the housing parts and the plug parts must manually be attached to each other and be pressed together. Alternatively, however, transferring the closure elements into their respective closed position can also be supported by providing magnetic means which support closing of the closure elements, in that they produce a force of magnetic attraction between the housing part and the plug part of each closure element.

For this purpose, one magnet each or a magnet on the one hand and a magnetic armature on the other hand in the form of a component made of a ferromagnetic material can be arranged on the plug part and on the housing part of each closure element. To support closing of each closure element, the magnetic means thus realized produce a force of magnetic attraction in closing direction between the plug part and the housing part and in the closed position of the respective closure element oppose each other in an attracting manner.

Advantageously, the catch and the magnetic means can be adjusted to each other such that the force of magnetic attraction is at least so great that for closing purposes the plug part automatically gets into engagement with the catch. When attaching the housing part to the plug part in closing direction, the plug part automatically or almost automatically slides into the associated catch in a magnetically supported way, so that each closure element closes in a simple and haptically pleasant way and no special care must be taken when attaching the housing parts to the plug parts.

In a further advantageous aspect, the magnetic means of the first closure element and of the second closure element can be polarized such that between the plug part of the first closure element and the housing part of second closure element, when the same are moved towards each other (wrongly), a force of magnetic repulsion acts. The magnetic means of the first closure element and the magnetic means of the second closure element thus are polarized inversely. In this way, the housing part of the first closure element can not or at least not easily be attached to the plug part of the second closure element and vice versa the housing part of the second closure element can not or at least only with difficulty be attached to the plug part of the second closure element. When a user wants to close the fastening arrangement in a wrong way, he will notice this force of magnetic repulsion and hence correct the alignment of the rigid element relative to the flexible element for correct attachment and fastening. For example, by suitable polarization of the magnetic means, the floor mats of driver and passenger also can be designed unmistakably.

In an advantageous aspect, the opening direction of the first closure element and the opening direction of the second closure element are directed antiparallel to each other, i.e. point in exactly opposite directions. It is, however, also conceivable and possible that the opening directions are directed obliquely to each other, wherein in each case, however, a direction component of the opening direction of the first closure element is directed opposite to a direction component of the second closure element.

The fastening arrangement includes a first closure element and a second closure element. In addition, however, one or more further closure elements can also be provided, which can be formed of the same type as the first closure element and the second closure element. In this case, the opening directions of all closure elements advantageously point towards a common center, so that the closure elements can jointly be opened by an opening force acting on this center or at least directed through the center and the flexible element hence can be released from the rigid element.

The closing direction of the first closure element and the closing direction of the second closure element advantageously are directed parallel to each other and vertical to a plane in which the opening directions of the closure elements extend. By attaching the housing parts and the plug parts to each other along the closing directions directed parallel to each other of the first closure element and of the second closure element, the fastening arrangement then can easily be closed and fastening can be accomplished without having to deform the flexible element from its relaxed, non-bent condition.

In a concrete configuration, the plug parts of the first closure element and of the second closure element can firmly be arranged on the rigid element and the housing parts of the first closure element and of the second closure element can firmly be arranged on the flexible element. What is, however, also conceivable and possible is the kinematically reverse arrangement, in which the plug parts are arranged on the flexible element and the housing parts are arranged on the rigid element. In addition an arrangement is conceivable in which the plug parts and the housing parts in part are arranged on the flexible element and in part on the rigid element.

The catch of each closure element advantageously can be formed by a catch spring arranged on the housing part, with which the associated plug part can latchingly be brought in engagement by attachment along the closing direction. The catch spring of each closure element can include a catch spring protrusion and the plug part of each closure element can include an engaging protrusion, wherein in the closed position of each closure element the catch spring protrusion of the catch spring and the engaging protrusion of the plug part are positively in engagement with each other such that the plug part is held at the housing part against the closing direction.

The catch spring can be formed to extend linearly along the opening direction with a catch spring protrusion extending linearly along the opening direction.

The catch spring can, however, also be formed as ring segment and in the closed position engage around a trunnion of the plug part in a circumferential direction around the closing direction. To provide for opening of the closure element by a relative movement of the housing part relative to the plug part, the catch spring arranged on the housing part then is circumferentially opened through an opening, so that for opening the closure element together with the catch spring arranged thereon the housing part can be moved relative to the plug part along the opening direction, the plug part thereby moves through the opening of the catch spring and gets out of engagement with the catch spring.

The catch spring of the first closure element and the catch spring of the second closure element for example each are arranged in a recess of the associated housing part and non-rotatably held at the housing part. In the closed position in the non-bent condition of the flexible element, the distance between the catch spring of the first closure element and the catch spring of the second closure element corresponds to the distance between the plug part of the first closure element and the plug part of the second closure element, and correspondingly the catch springs and the plug part are latchingly in engagement with each other.

For opening each closure element, the plug part can be shifted in the recess of the housing part by the relative movement of the housing part relative to the plug part, so that the plug part gets out of engagement with the catch spring arranged on the housing part and hence can be removed from the housing part, in order to release the flexible element from the rigid element. Such opening is effected by deforming the flexible element such that the distance between the housing parts or plug parts arranged on the flexible element is varied and hence the plug parts are moved relative to the housing parts.

The fastening arrangement is usable for connecting in principle any type of rigid element with in principle any type of flexible element. For example, the rigid element can be formed by a vehicle floor and the flexible element can be formed by a floor mat which is to be fastened to the vehicle floor. In another aspect, the rigid element for example can, however, also be formed by a helmet, in particular a ski helmet, and the flexible element can be formed by glasses to be attached to the helmet or by a visor. This example catalog should not be understood to be limiting. Fundamentally different possibilities of use for the fastening arrangement also are conceivable.

When the flexible element is formed by glasses or a visor and the rigid element is formed by a helmet, the flexible element in the form of the glasses or the visor can be curved with a first end and with a second end and an edge portion extending between the first end and the second end, via which the flexible element is to be attached to the rigid element in the form of the helmet. In a concrete configuration, the first closure element can be provided at the first end and the second closure element can be provided at the second end, in order to connect the first end and the second end of the flexible element with the rigid element via the closure elements. In addition, a third closure element can be provided, which is arranged on the edge portion between the first end and the second end and provides an additional fastening to the edge portion.

In a development, a display means additionally is provided, which is formed to indicate a position state of the fastening arrangement. In particular, the display means is formed to indicate whether or not the first closure element and/or the second closure element is in the closed position.

By means of such display means it can be indicated to a user that the flexible element is arranged and fastened to the rigid element in a correct, desired way. The user thus receives a feedback on the fact that the fastening operation (i.e. the transfer into the closed position of the closure elements) has been terminated in the desired way. In this way, it can be ensured that it is indicated to a user, if fastening of flexible element (e.g. the floor mat) to the rigid element (e.g. the vehicle floor) has not yet or not yet completely been effected.

In a concrete configuration, the display means can comprise an electronic magnetic field sensor, in particular a reed switch, which upon transfer of the first and/or second closure element into the closed position is actuated due to an interaction with the magnetic means and is connected with a measuring means for evaluating a switching condition of the reed switch. A reed switch is a switching contact which includes contact blades fused into a glass bulb under vacuum or shielding gas, which at the same time form a contact spring and a magnetic armature. Reed switches are known per se, so that the same will not be discussed here in more detail.

Other sensors are also conceivable, for example a Hall sensor.

Such reed switch for example can be arranged in direct vicinity of a magnet arranged on the plug part and detect a change of the magnetic field upon approach of a magnet arranged on the housing part, in order to generate a signal via the measuring means, which indicates the transfer into the closed position.

In another concrete, purely mechanical variant of a display means, the display means can comprise a movable component which upon transfer of the first and/or second closure element into the closed position is actuated due to an interaction with the magnetic means, in order to indicate whether or not the first closure element and/or the second closure element is in the closed position. The movable component for example can be formed by a magnet arranged on the housing part, which is biased with respect to the housing part via a spring. When approaching a magnet of the plug part during transfer of the closure element into the closed position, the magnet of the housing part is magnetically attracted and hence moved, wherein a mark can be provided on the magnet, which indicates the transfer into the closed position.

The idea underlying the invention will be explained in detail below with reference to the exemplary embodiments illustrated in the Figures, in which:

FIG. 1A shows a top view of a fastening arrangement for fastening a flexible element in the form of a floor mat to a rigid element in the form of a vehicle floor, in a closed position;

FIG. 1B shows a sectional view through the fastening arrangement along line A-A of FIG. 1A;

FIG. 1C shows an enlarged representation of the view of FIG. 1B in the section B;

FIG. 2A shows a top view of the fastening arrangement on opening;

FIG. 2B shows a sectional view of the fastening arrangement along line A-A of FIG. 2A;

FIG. 3B shows another perspective exploded view of a closure element of the fastening arrangement;

FIG. 11A shows a side view of the arrangement of FIG. 10;

FIG. 11B shows a sectional view along line A-A of FIG. 11A;

Figure 14:
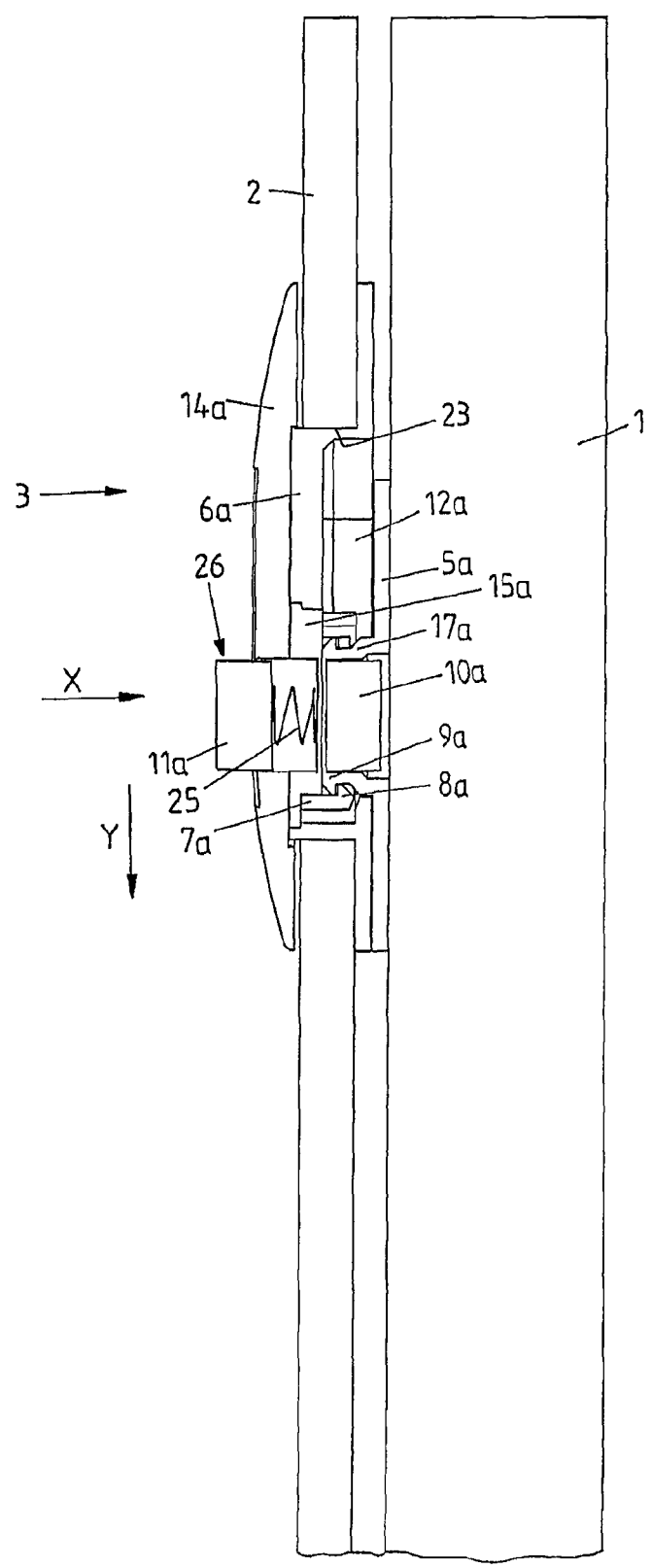

FIG. 13 shows a view of an exemplary embodiment modified as compared to the exemplary embodiment of FIGS. 1 to 3 with a display means for indicating whether or not the first closure element is in the closed position; and FIG. 14 shows a view of a further exemplary embodiment modified as compared to the exemplary embodiment of FIGS. 1 to 3 with a display means for indicating whether or not the first closure element is in the closed position.

FIGS. 1 to 3 show a first exemplary embodiment of a fastening arrangement for fastening a rigid element in the form of a vehicle floor 1 with a flexible element in the form of a floor mat 2.

Figure 2C:
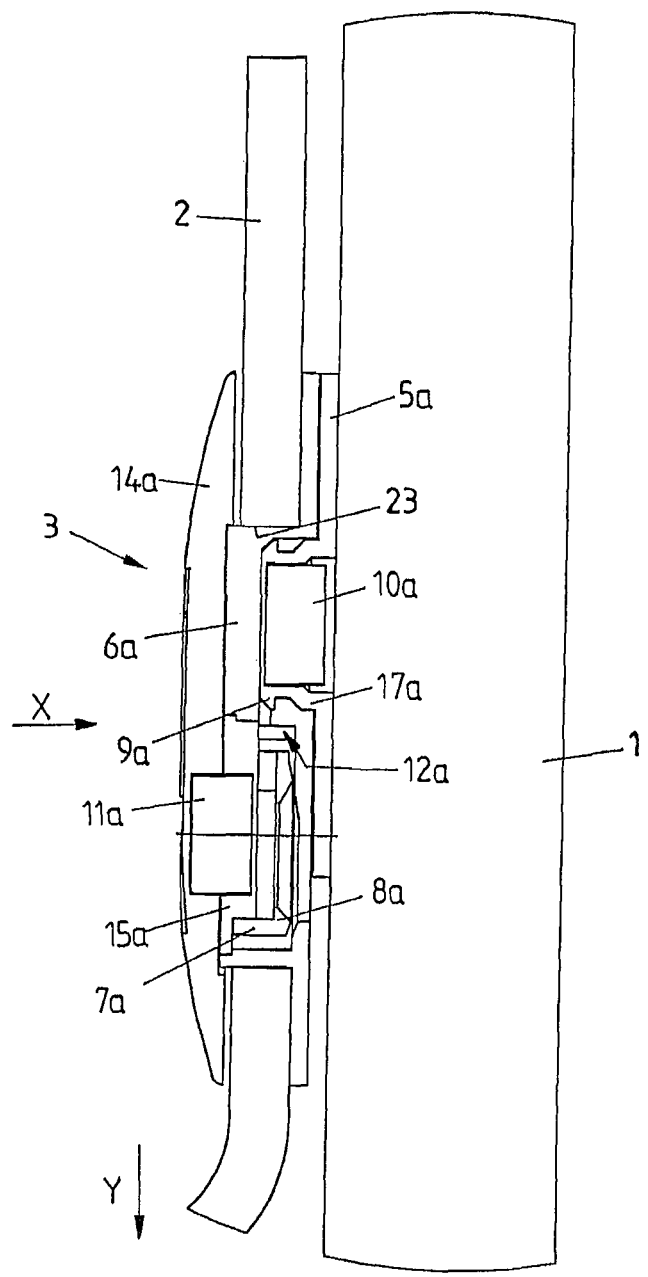
FIG. 2C shows an enlarged representation of the view of FIG. 2B in the section B.
Figure 3A:
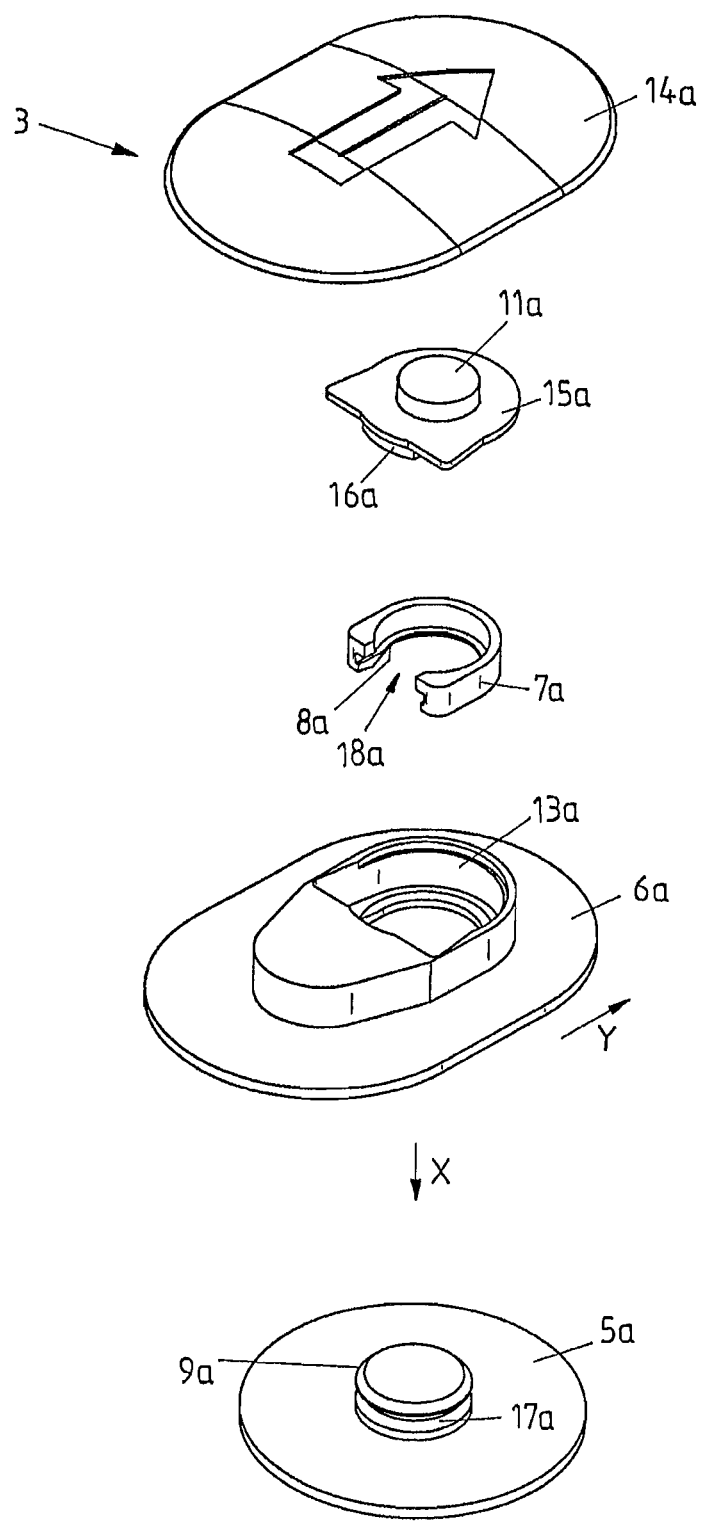
FIG. 3A shows a perspective exploded view of a closure element of the fastening arrangement.

The fastening arrangement includes two closure elements 3, 4 which serve for fastening the floor mat 2 at two points with the vehicle floor 1. FIGS. 1A and 1B show the fastening arrangement in a closed position, in which the floor mat 2 is fastened to the vehicle floor 1 and the closure elements 3, 4 each are closed. FIGS. 2A to 2C show the fastening arrangement on opening, in order to be able to release the floor mat 2 from the vehicle floor 1 and remove the same from the vehicle floor 1. FIGS. 3A and 3B show exploded views of an individual closure element 3.

The floor mat 2 is connected with the vehicle floor 1 via the two closure elements 3, 4. The closure elements 3, 4 are identically constructed and identical in their mode of operation, but differ in their arrangement, as will yet be explained below.

Each closure element 3, 4 includes the components shown in FIGS. 3A and 3B. The construction and the function of the closure elements 3, 4 will be explained below with reference to the first closure element 3 shown above in FIGS. 1B and 2B.

The closure element 3 includes a housing part 6a arranged on the floor mat 2 and a plug part 5a firmly arranged on the vehicle floor 1. On the housing part 6a a catch spring 7a is non-rotatably arranged via an insert part 15a. The catch spring 7a is inserted into a recess 12a of the housing part 6a via an opening 13a and held via the insert part 15a, in that the catch spring 7a comes to rest against a protrusion 16a of the insert part 15a and the insert part 15a closes the opening 13a in the mounted condition. The protrusion 16a positively reaches through an opening 18a circumferentially opening the catch spring 7a and in this way non-rotatably holds the catch spring 7a in circumferential direction around the closing direction X.

The catch spring 7a is designed in the manner of a ring segment and includes a catch spring protrusion 8a which is formed on an outer edge of the catch spring 7a pointing out of the recess 12a and partly extends around the catch spring 7a. The catch spring 7a is formed to be latchingly brought in engagement with a trunnion 17a of the plug part 5a, so that in a closed position the trunnion 17a with an engaging protrusion 9a is positively in engagement with the catch spring protrusion 8a of the catch spring 7a and hence is held at the housing part 6a.

To transfer the closure element 3 into its closed position, the housing part 6a with the latching element 7a arranged thereon is attached to the trunnion 17a of the plug part 5a in a closing direction X, so that the catch spring 7a with its catch spring protrusion 8a latchingly gets in engagement with the engaging protrusion 9a of the trunnion 17a. The catch spring 7a is formed elastically resilient in the plane transverse to the closing direction X and thus can escape when it is attached to the trunnion 17a and is spread by the same transverse to the closing direction X.

To be able to open the closure element 3 out of the closed position, the catch spring 7a is formed circumferentially open with the opening 18a. This opening 18a is designed such that in the closed position the catch spring 7a circumferentially engages around the trunnion 17a to such an extent that the trunnion 17a is also held at the catch spring 7a in the plane transverse to the closing direction X. Due to the opening 18a, the housing part 6a together with the catch spring 7a can, however, be moved in an opening direction Y, which is directed vertical to the closing direction X, relative to the plug part 5a with the trunnion 17a, in order to bring the trunnion 17a—by elastically expanding the catch spring 7a transverse to the closing direction X—out of engagement with the catch spring 7a through the opening 18a. The trunnion 17a thereby is moved in the recess 12a of the housing part 6a and, when it has been brought out of engagement with the catch spring 7a, can be removed from the recess 12a.

At the housing part 6a on the one hand and at the plug part 5a on the other hand magnetic means are provided in the form of two magnets 10a, 11a, which oppose each other in a magnetically attracting way when the housing part 6a is attached to the plug part 5a in closing direction X and thus magnetically support the transfer of the closure element 3 into the closed position.

A magnet 10a here is arranged on the trunnion 17a of the plug part 5a, whereas another magnet 11a is fastened to the insert part 15a of the housing part 6a. Together with the catch spring 7a, the magnets 10a, 11a can be adjusted and dimensioned such that when attaching the housing part 6a to the plug part 5a, the catch spring 7a largely automatically gets latchingly in engagement with the trunnion 17a, so that the transfer into the closed position can be effected easily and largely automatically.

While the plug part 5a is arranged on the vehicle floor 1 (see e.g. FIG. 1B), the housing part 6a is fastened to the floor mat 2. For this purpose, as shown for example in FIG. 1B, the housing part 6a reaches through an opening 23 of the floor mat 2 and is latchingly or adhesively connected with a lid 14a, wherein both the housing part 6a and the lid 14a have edge portions which reach over the edge of the opening 23 of the floor mat 2 and thus fix the housing part 6a at the floor mat 2.

For fastening the floor mat 2 to the vehicle floor 1 two closure elements 3, 4 are provided, as is shown in FIGS. 1A to 1C and 2A to 2C. Each closure element includes a housing part 6a, 6b and a plug part 5a, 5b. The housing part 6a, 6b here is arranged on the floor mat 2 and the plug part 5a, 5b is arranged on the vehicle floor 1.

FIGS. 1A to 1C show the fastening arrangement with the two closure elements 3, 4 first in their closed position, in which the floor mat 2 is fastened to the vehicle floor 1. In this closed position each closure element 3, 4 is closed, in that the trunnion 17a, 17b of the plug part 5a, 5b is latchingly in engagement with the catch spring 7a, 7b of the housing part 6a, 6b.

To obtain this closed position, the floor mat 2 together with the housing parts 6a, 6b arranged thereon has each been attached to the associated plug part 5a, 5b in a closing direction X (closure element 3) or X' (closure element 4). The closing directions X, X' of the first closure element 3 and of the second closure element 4 are directed parallel to each other, and attaching the housing parts 6a, 6b to the plug parts 5a, 5b is effected when properly inserting the floor mat 2, i.e. substantially with undeformed floor mat 2, so that to obtain the closed position the housing parts 6a, 6b together with the catch springs 7a, 7b arranged thereon have been brought into a position opposite the plug parts 5a, 5b with the trunnions 17a, 17b arranged thereon, and the catch springs 7a, 7b can be brought in engagement with the trunnions 17a, 17b. In the closed position, the distance A1 between the trunnions 17a, 17b of the plug parts 5a, 5b correspondingly is equal to the distance A2 between the catch springs 7a, 7b (this means that the middle axes of the trunnions 17a, 17b pointing through the center and the middle axes of the catch springs 7a, 7b pointing through the center have the same distance to each other.

The closure elements 3, 4 are aligned opposite to each other, in that the housing parts 6a, 6b are arranged and fixed on the floor mat 2 mirror-symmetrically. Thus, the opening direction Y of the first closure element 3, in which the housing part 6a must be moved for releasing the trunnion 17a from the catch spring 7a, is directed opposite, i.e. antiparallel to the opening direction Y' of the second closure element 4, in which the housing part 6b of the second closure element 4 must be moved for releasing the trunnion 17b from the catch spring 7b. Thus, for opening the fastening arrangement the floor mat 2 must be deformed, as shown in FIG. 2B, in order to move the housing parts 6a, 6b towards each other in the respective opening direction Y, Y' and thereby bring the trunnions 17a, 17b of the plug parts 5a, 5b in the recesses 12a, 12b out of engagement with the catch springs 7a, 7b.

Opening for example can be effected by pulling against the closing directions X, X' at a central point of the floor mat 2 located between the closure elements 3, 4, in order to effect a deformation of the floor mat 2 as shown in FIG. 2B and hence effect a displacement of the housing parts 6a, 6b relative to the plug parts 5a, 5b. For opening, the distance A2 between the catch springs 7a, 7b thus is reduced, so that this distance A2 no longer corresponds to the distance A1 between the trunnions 17a, 17b of the plug parts 5a, 5b.

When the trunnions 17a, 17b are brought out of engagement with the catch springs 7a, 7b, the floor mat 2 with the housing parts 6a, 6b arranged thereon can be removed from the vehicle floor 1 against the closing directions X, X'.

With such fastening arrangement, unintentional release is not possible or only with difficulty. In the closed position, the fastening arrangement safely and firmly holds the floor mat 2 on the vehicle floor 1 and can be released from the vehicle floor 1 only by consciously deforming the same as shown in FIG. 2B.

Due to the fact that magnetic means in the form of magnets 10a, 10b, 11a, 11b each are provided at the closure elements 3, 4, transferring into the closed position of the closure elements 3, 4, i.e. fastening the floor mat 2 to the vehicle floor 1, largely is effected automatically, so that the floor mat 2 can be fixed at the vehicle floor 1 in safe and simple way and the risk for a incomplete or incorrect fastening to the vehicle floor 1 is substantially reduced.

The magnetic means 10a, 11a of the first closure element 3 and the magnetic means 10b, 11b of the second closure element 4 here can be polarized inversely, so that a wrong attachment for example of the housing part 6a of the first closure element 3 to the plug part 5b of the second closure element 4 becomes difficult due to the fact that between the magnet 11a of the housing part 6a and the magnet 10b of the plug part 5b a force of magnetic repulsion exists when approaching the housing part 6a to the plug part 5b, which is perceptible for a user and hence indicates a wrong attachment.

As shown in FIGS. 1A and 2A, the lids 14a, 14b of the closure elements 3, 4 can be printed or otherwise be provided with arrows on their side facing away from the vehicle floor 1 and visible to the outside, which arrows indicate the opening direction Y, Y' for opening the closure elements 3, 4.

FIGS. 4 to 12 show a further exemplary embodiment of a fastening arrangement for connecting a rigid element in the form of a helmet 1 and a flexible element in the form of glasses or a visor 2.

Fastening the flexible element 2 to the rigid element 1 in turn is accomplished via closure elements 3, 4, 19, whose operating principle is similar to the exemplary embodiment described above. Therefore, components of the same function will be provided with the same reference numerals, as far as expedient.

Figure 4:
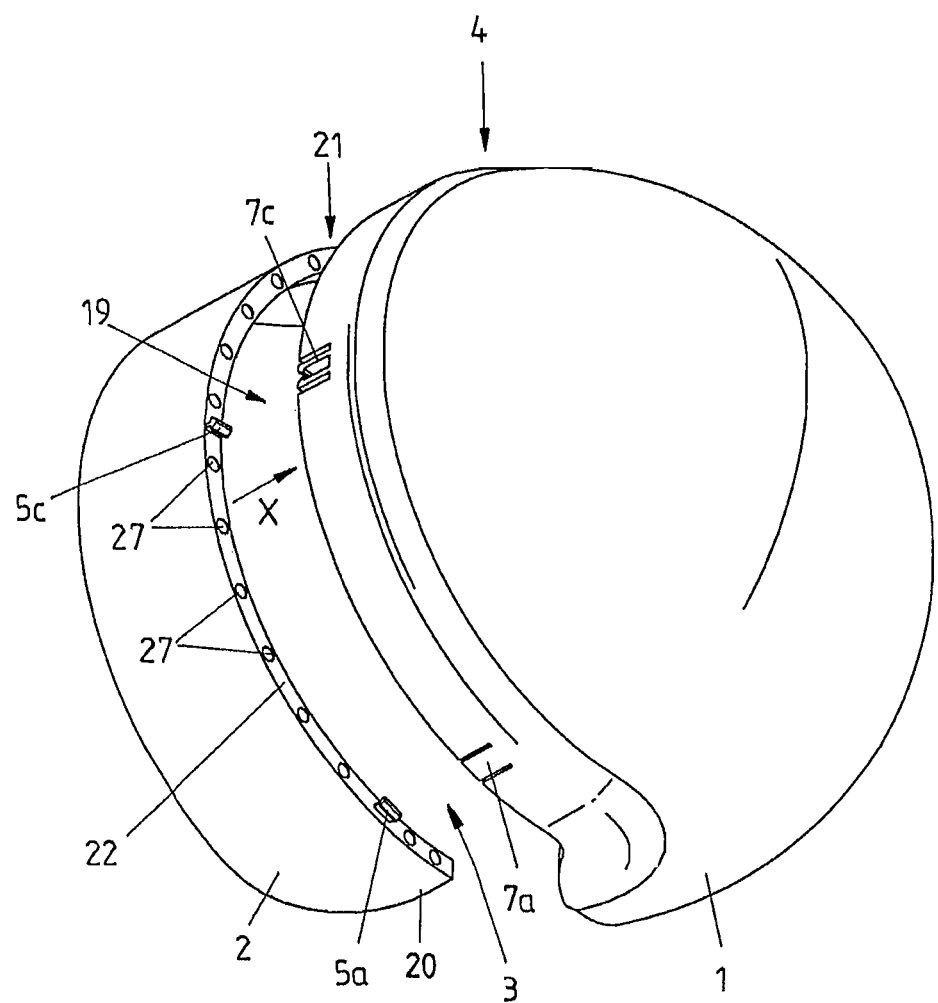
FIG. 4 shows a perspective view of a fastening arrangement for fastening a flexible element in the form of glasses or a visor to a rigid element in the form of a helmet, before closing.
Figure 5A:
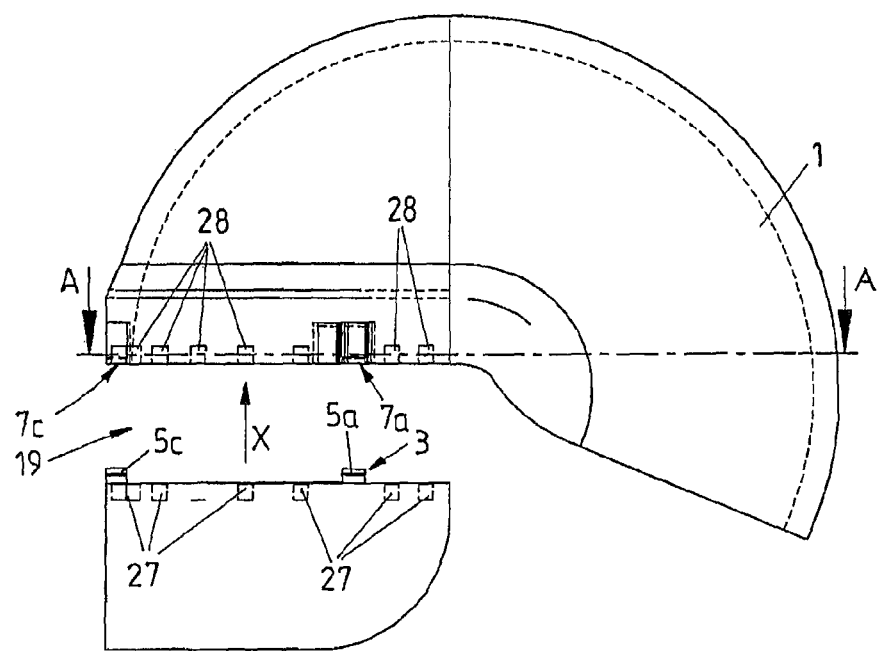
FIG. 5A shows a side view of the arrangement of FIG. 4.
Figure 5B:
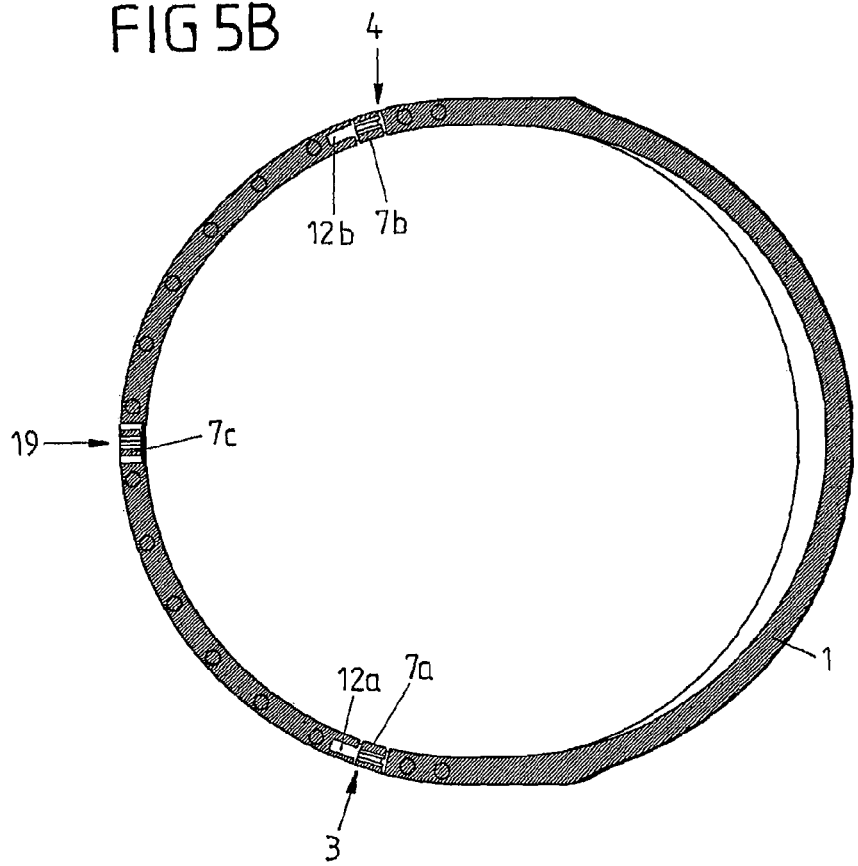
FIG. 5B shows a sectional view along line A-A of FIG. 5A.
Figure 6A:
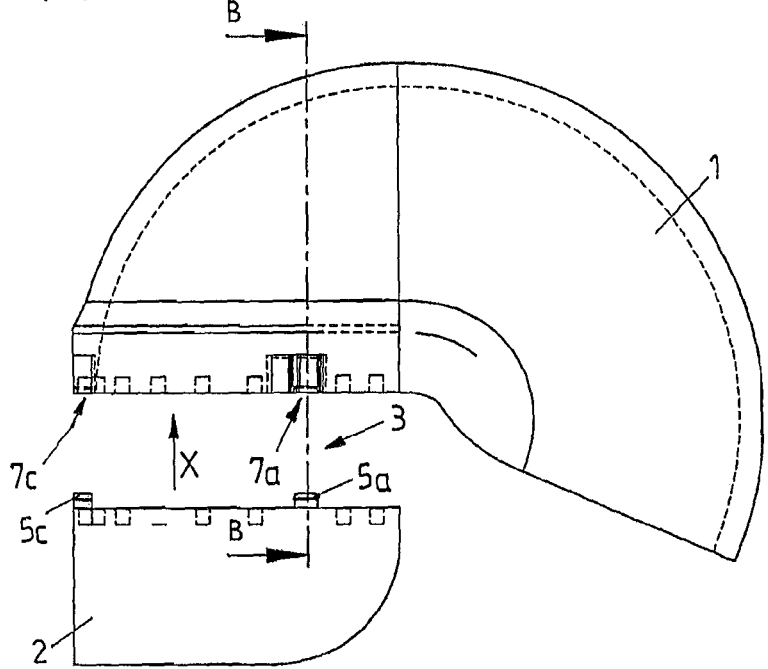
FIG. 6A shows a side view of the arrangement of FIG. 4.
Figure 6B:
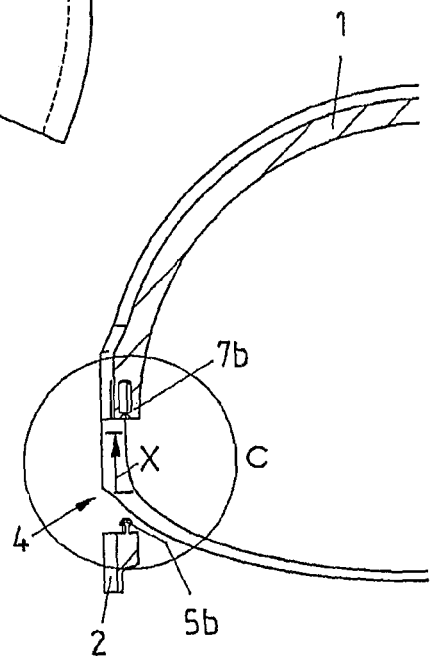
FIG. 6B shows a partial sectional view along line B-B of FIG. 6A.
Figure 6C:
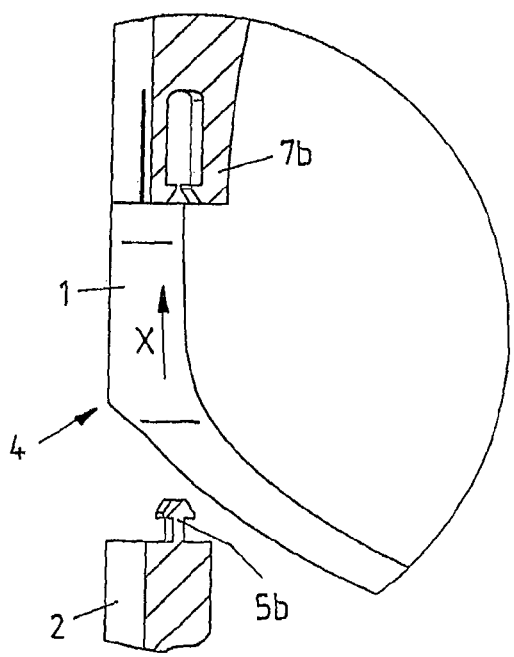
FIG. 6C shows an enlarged representation of the view of FIG. 6B in the section C.
Figure 7:
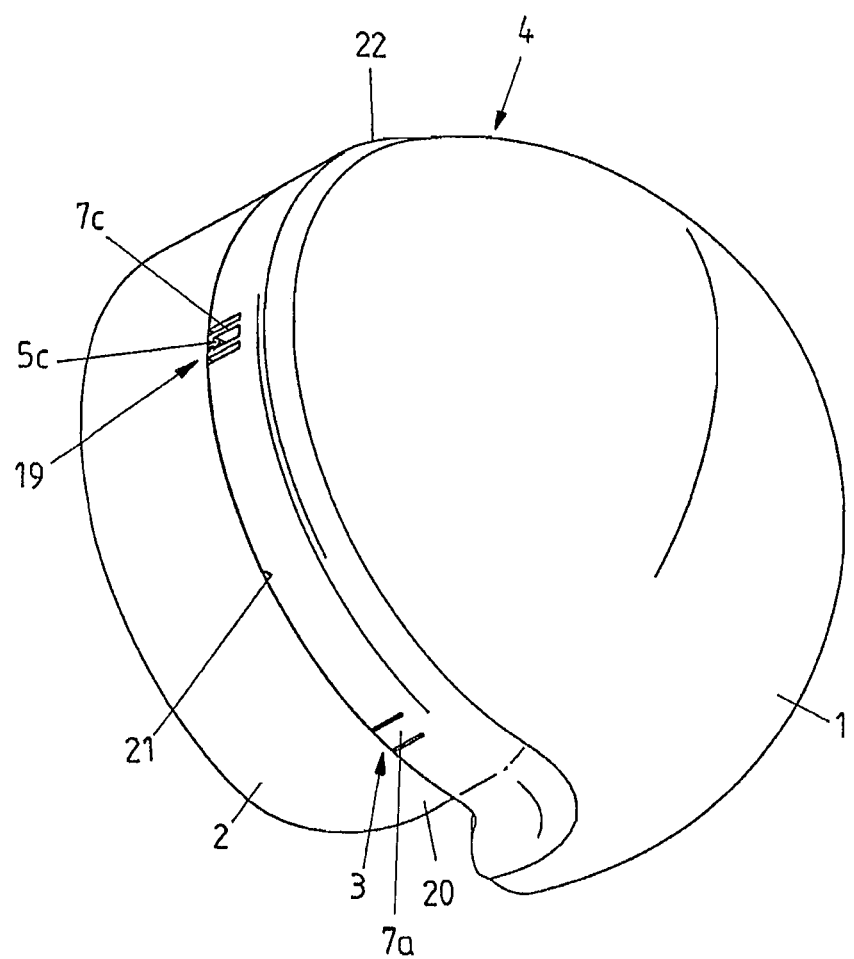
FIG. 7 shows a perspective view of the arrangement in a closed position.
Figure 8A:
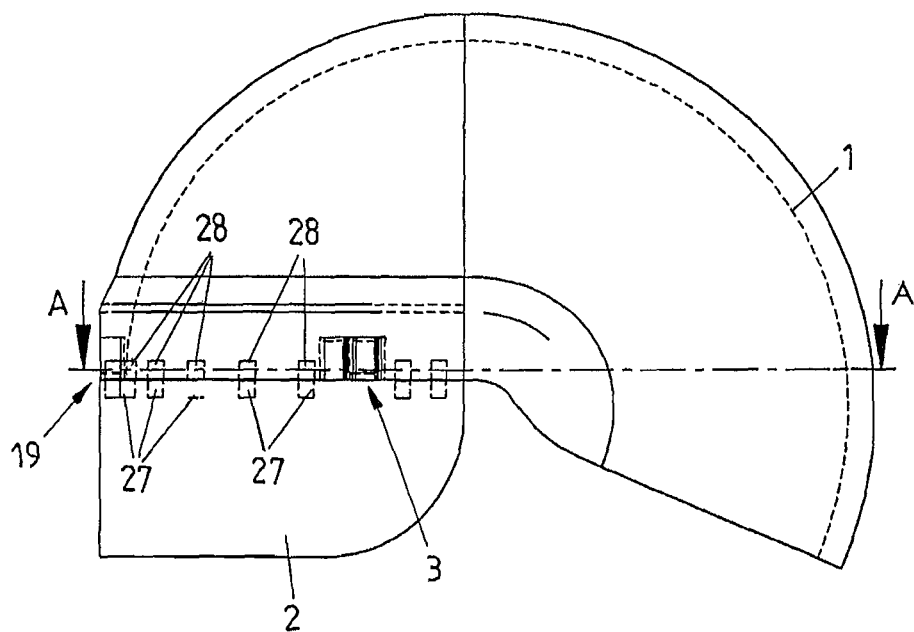
FIG. 8A shows a side view of the arrangement of FIG. 7.
Figure 8B:
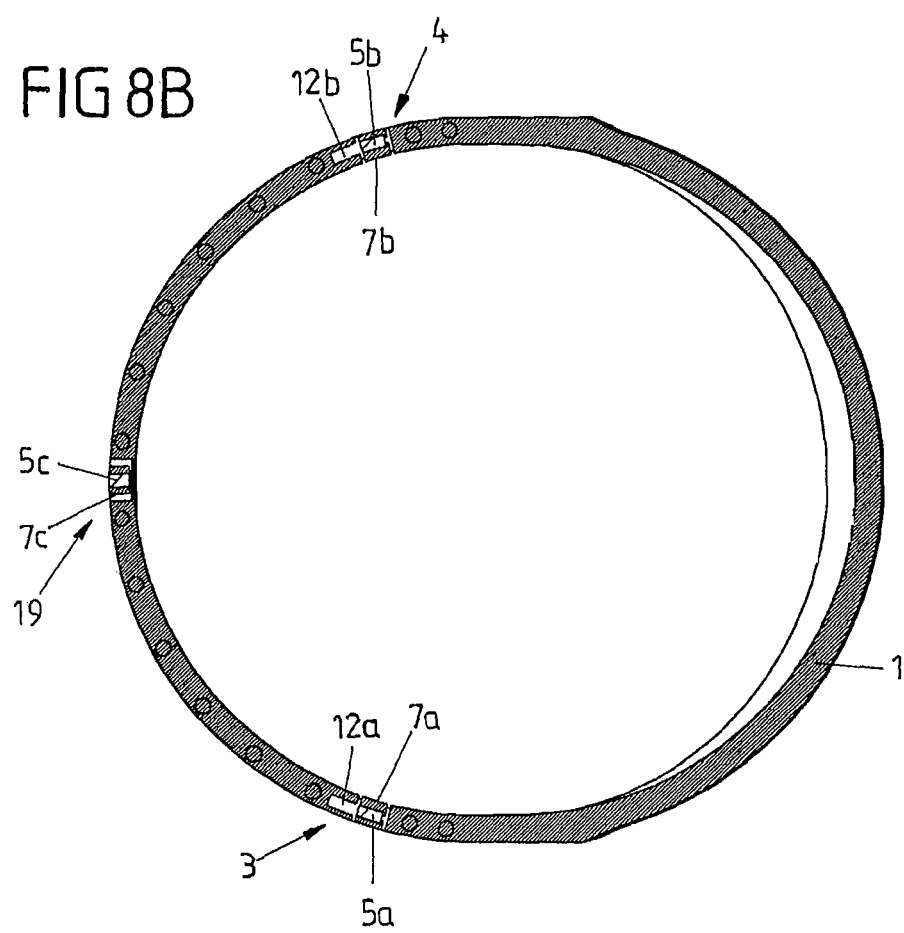
FIG. 8B shows a sectional view along line A-A of FIG. 8A.
Figure 9A:
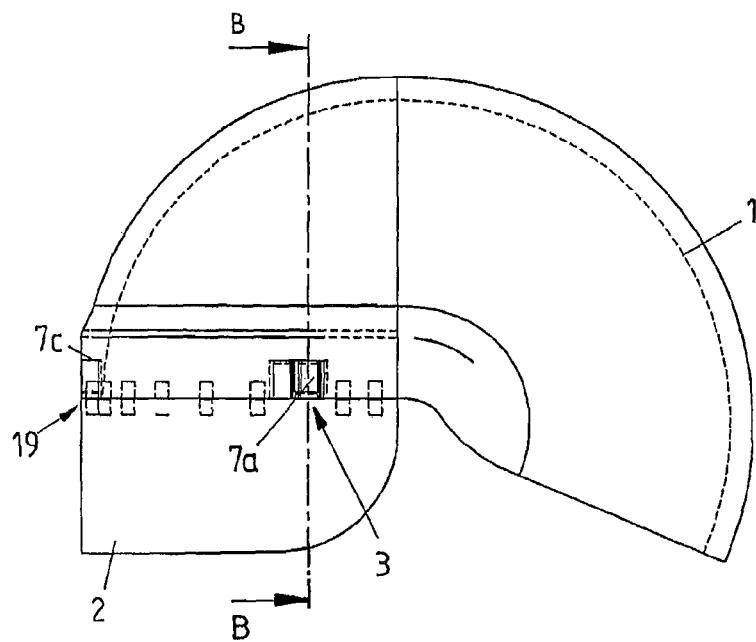
FIG. 9A shows a side view of the arrangement of FIG. 7.
Figure 9B:
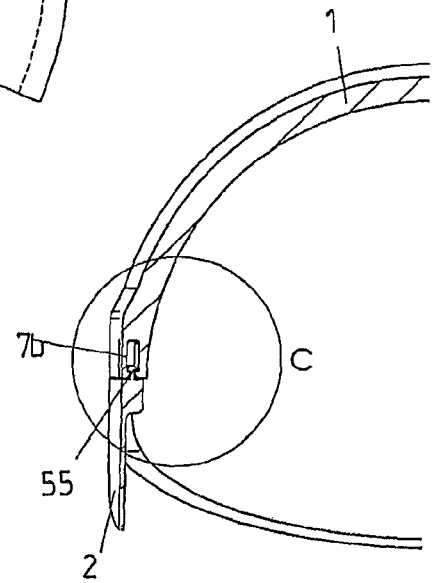
FIG. 9B shows a partial sectional view along line B-B of FIG. 9A.
Figure 9C:
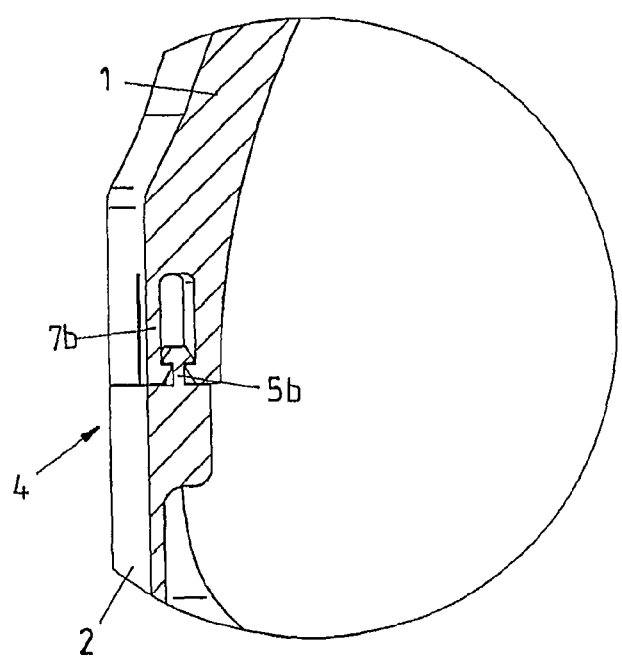
FIG. 9C shows an enlarged representation of the view of FIG. 9B in the section C.
Figure 10:
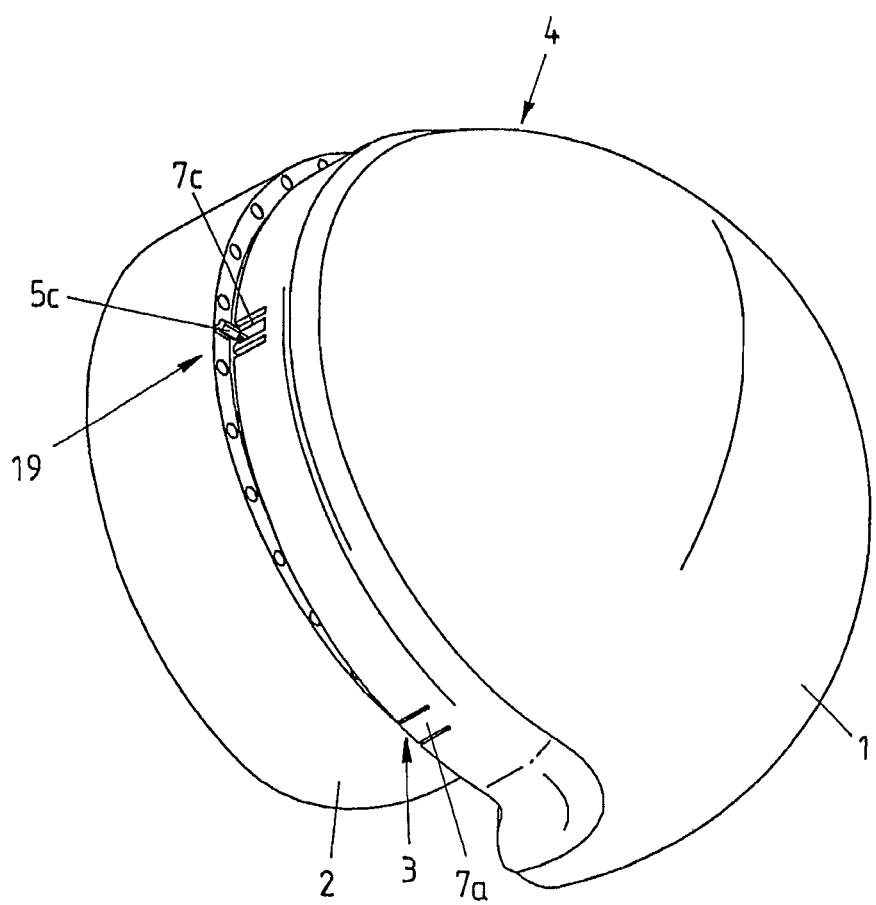
FIG. 10 shows a perspective view of the arrangement on opening.
Figure 12A:
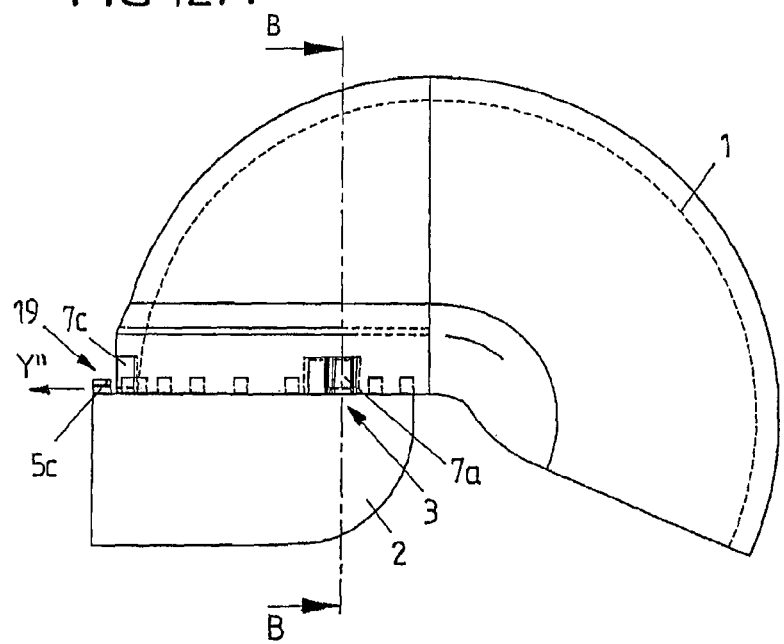
FIG. 12A shows a side view of the arrangement of FIG. 10.
Figure 12B:
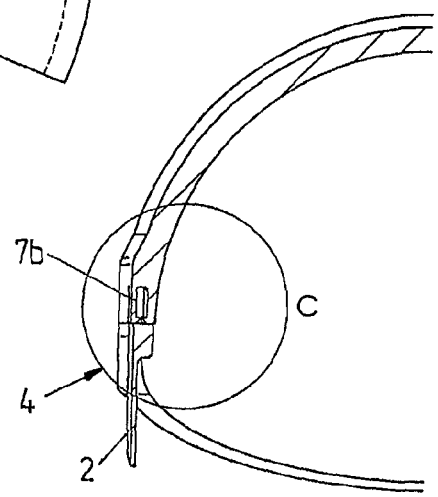
FIG. 12B shows a partial sectional view along line B-B of FIG. 12A.
Figure 12C:
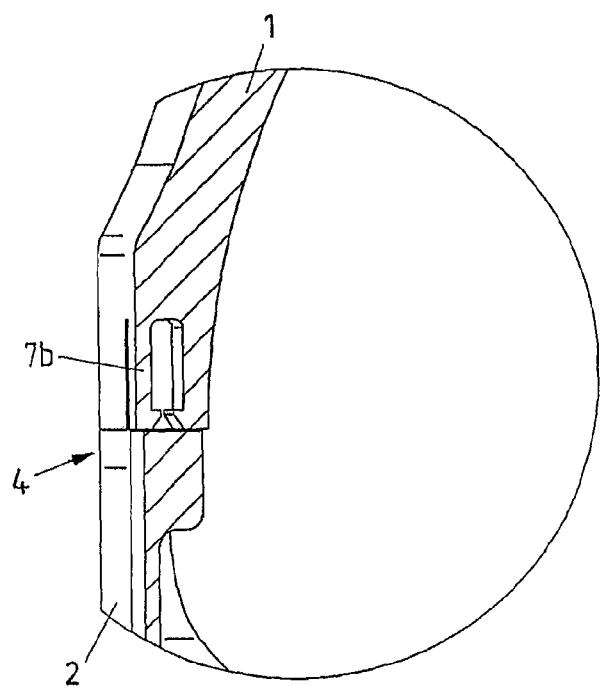
FIG. 12C shows an enlarged representation of the view of FIG. 12B in the section C.

In FIGS. 4 to 6, the helmet 1 and the glasses 2 (in the following the term "glasses" will be used throughout, as a synonym for a pair of glasses or a visor) are shown in the non-connected condition. In FIGS. 7 to 9, the glasses 2 are connected with the helmet 1 in a closed position. FIG. 10 shows the helmet 1 and the glasses 2 when releasing the glasses 2.

In the fastening arrangement as shown in FIGS. 4 to 12 three closure elements 3, 4, 19 are provided, which serve to connect the glasses 2 with the helmet 1. For forming the closure elements 3, 4, 19, catch springs 7a, 7b, 7c are integrally molded to the helmet 1. The housing parts of the closure elements 3, 4, 19 are formed by the helmet 1 itself and thus, are integrally formed with the helmet 1. On the glasses 2, plug parts 5a, 5b, 5c are arranged, which are attached to the catch springs 7a, 7b, 7c along a closing direction X and can latchingly be brought in connection with the same.

The three closure elements 3, 4, 19 serve to connect the glasses 2 with the helmet 1 at two ends 20, 21 and at an edge portion 22 between the ends 20, 21. For this purpose, the plug parts 5a, 5b, 5c are arranged at the edge portion 22 and protrude from the same in direction of the helmet 1, wherein the plug parts 5a, 5b are arranged in the region of the ends 20, 21 of the glasses 2, while the plug part 5c is formed at the edge portion 22 centrally between the plug parts 5a, 5b.

For fastening the glasses 2 to the helmet 1, the glasses 2 are attached to the helmet 1 from the opened condition shown in FIGS. 4, 5A, 5B and 6A to 6C in the closing direction X, so that the plug parts 5a, 5b, 5c latchingly get in engagement with the catch springs 7a, 7b, 7c.

FIGS. 7, 8A, 8B and 9A to 9C show the helmet 1 with the glasses 2 attached thereto. In this closed position, as can be taken in particular from the sectional view of FIG. 9C, the plug parts 5a, 5b, 5c are latchingly and positively in engagement with the catch springs 7a, 7b, 7c, so that the glasses 2 cannot be removed from the helmet 1 against the closing direction X.

For opening, the plug parts 5a, 5b of the closure elements 3, 4 can be shifted into a recess 12a, 12b relative to the catch springs 7a, 7b (see FIGS. 8B and 11B) by moving the catch springs 7a, 7b and the plug parts 5a, 5b, as shown in FIG. 11B, in an opening direction Y (closure element 3) and an opening direction Y' (closure element 4), respectively. These opening directions Y, Y' of the closure elements 3, 4 are obliquely directed to each other and point towards each other with a direction component Y1, Y1'.

Due to the fact that the plug parts 5a, 5b are moved relative to the catch springs 7a, 7b of the closure elements 3, 4 in the opening directions Y and Y', respectively, the plug part 5c of the third closure element 19 also is moved relative to the catch spring 7c in an opening direction Y" and shifted out of the catch spring 7c. When the plug parts 5a, 5b of the closure elements 3, 4 are fully pushed into the recesses 12a, 12b, the plug part 5c of the third closure element 19 also is pushed out of the associated catch spring 7c, so that the glasses 2 can be removed from the helmet 1.

To support the transfer of the glasses 2 into their closed position at the helmet 1, magnetic means 27, 28 in turn can be provided at the closure elements 3, 4, 19, as explained above with reference to the exemplary embodiment of FIGS. 1 to 3, which produce a force of magnetic attraction between the plug parts 5a, 5b, 5c and the catch springs 7a, 7b, 7c in the closing direction X, so that transferring the plug parts 5a, 5b, 5c into their position locked into place with the catch springs 7a, 7b, 7c largely can be effected automatically.

The magnetic means 27, 28 are formed in the form of magnets or a magnet on the one hand and of a magnetic armature of a ferromagnetic material on the other hand, and on the one hand are arranged on the edge portion 22 of the glasses 2 and on the other hand on the helmet 1. One magnet (or magnetic armature) at the edge portion 22 each is associated to a magnet (or magnetic armature) at the helmet 1. The magnetic means 27, 28 effect a force of magnetic attraction in direction of closing of the fastening arrangement.

Due to the fact that the magnetic means 27, 28 are arranged spatially separate from the plug parts 5a, 5b, 5c and the catch springs 7a, 7b, 7c, a thin construction of the glasses 2 and the helmet 1 becomes possible.

The number of the pairs of magnets realizing the magnetic means 27, 28 (or of the pairs consisting of one magnet each at the one component and of an associated magnetic armature at the other component) can differ from the number of the closure elements 3, 4, 19.

A fastening arrangement with closure elements 3, 4, 19 and spatially separate magnetic means 27, 28 generally can also be used advantageously for forming a surface closure with which two surfaces should be attached to each other. The number of the pairs of magnets (or of the pairs consisting of one magnet each at the one component and of an associated magnetic armature at the other component) can be greater equal to or smaller than the number of the closure elements 3, 4, 19.

The glasses 2 realizing the flexible element preferably are formed elastic. In the starting position adopted by the glasses 2 for attachment to the helmet 1 (see FIG. 4) the glasses 2 are relaxed, so that they can easily be attached to the helmet 1 in the closing direction X and the plug parts 5a, 5b, 5c can latchingly be brought in engagement with the catch springs 7a, 7b, 7c.

For moving the plug parts 5a, 5b in the opening directions Y, Y', the glasses 2 then must be deformed elastically for the plug parts 5a, 5b to be pushed into the recesses 12a, 12b, so that the glasses 2 are elastically tensioned for opening.

The force required for elastically tensioning the glasses 2, which must be applied for opening, effects that an unintentional release of the glasses 2 is counteracted. When tensioning the glasses 2, an elastic restoring force always acts back into the closed position (see FIG. 8B), so that only by consciously deforming the glasses 2 and opening in the way shown in FIG. 11B the connection of the glasses 2 with the helmet 1 can be released.

FIGS. 13 and 14 show two exemplary embodiments of a combination of a closure element 3 with a display means for indicating whether or not the fastening arrangement is in the closed position.

FIGS. 13 and 14 each show a view corresponding to FIG. 1C, representing a closure element 3 for connecting a floor mat 2 with a vehicle floor 1. In addition, a display means is provided, which in the exemplary embodiment of FIG. 13 is formed by a reed switch 23 and a measuring means 24 and in the exemplary embodiment of FIG. 14 by a movably arranged magnet 11a.

In the exemplary embodiment of FIG. 13, the reed switch 23 is arranged in direct vicinity of the magnet 10a on the plug part 5a of the closure element 3. The reed switch 23 here is formed to distinguish the closed position and an open position with the plug part 5a and the housing part 6a separate from each other with reference to the strength and/or the particular shape of the magnetic field between the magnetic means in the form of the magnets 10a, 11a on the plug part 5a on the one hand and on the housing part 6a on the other hand.

When transferring the closure element 3 into the closed position and correspondingly approaching the housing part 6a with the magnets 11a arranged thereon to the plug part 5a with the magnet 10a arranged thereon, the reed switch 23 will switch, which is recorded by the measuring means 24 and converted into a corresponding signal for indicating that the closed position is reached.

In the exemplary embodiment of FIG. 14, the display means is realized purely mechanically. For this purpose, the magnet 11a is movably arranged on the housing part 6a along the closing direction X and pretensioned against the housing part 6a by a spring 25. In an open position, the magnet 11a is in an extended position due to the pretension. When the housing part 6a is approached to the plug part 5a for transferring the closure element 3 into the closed position, the magnets 10a, 11a attract each other and the movable magnet 11a is retracted into the housing part 6a in direction of the magnet 10a. By a corresponding mark on a side face 26 of the magnet 11a, for example a color mark, reaching the closed position then can be indicated in a suitable way.

The display means for indicating the position state also can be realized by other means. For example, in the plug part 5a a first magnet 10a and in the housing part 6a a second magnet 11a can firmly be arranged, which attract each other. In addition, at the housing part 6a a further magnet with reverse polarity then can movably be mounted on the back of the second magnet 11a, which is pretensioned with respect to the second magnet 11a by a return spring. When reaching the closed position, the magnetic field on the back of the second magnet 11a is amplified and the further magnet accordingly is pressed against the return spring more strongly, so that due to the change in position of the further magnet the closed position is indicated.

An indication of the position state by using a suitable display device in principle is not limited to a fastening arrangement as shown here, but can also be provided in any other closure elements and closure devices. Thus, a display means as described here can be used in any closure device as it is known for example from WO 2008/006 357 A2, WO 2009/092 368 A2, WO 2010/006 594 A2, WO 2008/006 354 A2, WO 2008/006 356 A2, WO 2009/010 049 A2 and WO 2009/127 96 A2 WO 2009/127 196 A2, whose contents are included in the present application by reference. In so far, the use of such display device in connection with a closure device, as it is known from these documents, represents an independent inventive idea.

Such closure device for example can generally include a plug part, a housing part and a catch, wherein
  the closure device is to be closed by attaching the housing part and the plug part to each other in a closing direction, so that in a closed position the plug part and the housing part are held at each other by the catch against the closing direction, and
  the housing part is formed such that by means of a relative movement of the housing part relative to the plug part in an opening direction, which differs from the closing direction, the plug part is pushed out of the catch and the closure element hence can be opened.

In such closure device, a display means is provided for indicating whether or not the first closure element and/or the second closure element is in the closed position.

In addition, magnetic means can be provided to support the closing of the closure device.

For example, the display means also can be used to initiate further measures independent of reaching or releasing the closed position. In a glove box, for example, a glove box light can be switched off when reaching the closed position, or vice versa the glove box light can be switched on when releasing the closed position. By means of the display means, the glove box light thus can be controlled, in order to be actuated safely and reliably in dependence on the actuation of a suitable closure device.

A (general) closure device with a display means for example also can advantageously be employed on a machine housing or on a switch cabinet, in order to indicate correct closing of a machine cover or a switch cabinet door.

By means of such general closure device it is possible to integrate three assemblies, which conventionally are present separate from each other, into one construction unit. The closure device on the one hand performs the function of a mechanical latch, secondly the function of a closing support by using the magnetic means, and thirdly the function of a position indicator by using the display means, on the basis of which further (control) measures (such as in a glove box) can also be initiated.

In this connection, the closure devices known from WO 2008/006 357 A2, WO 2009/092 368 A2, WO 2010/006 594 A2, WO 2008/006 354 A2, WO 2008/006 356 A2, WO 2009/010 049 A2 or WO 2009/127 96 A2 can also be designed purely mechanically, i.e. without magnetic means in the form of magnets or magnetic armatures.

The invention claimed is:

1. A fastening arrangement for fastening a flexible element to a rigid element, comprising a first closure element and a second closure element, which each consists of a plug part, a housing part and a catch arranged on the housing part, and further comprising magnetic means for supporting a closing of the closure elements, wherein
  each closure element is closed in that the plug part is put together with the housing part in a closing direction until the plug part snaps into place with the catch on the housing part in a closed position, so that the plug part and the housing part are held at each other against the closing direction via the catch,
  each housing part is formed such that by means of a relative movement of the housing part relative to the plug part in an opening direction, which differs from the closing direction, the plug part is pushed out of the catch and the closure element hence can be opened,
  the plug part of the first closure element and the plug part of the second closure element are firmly arranged on the one of the rigid element and the flexible element, and the housing part of the first closure element and the housing part of the second closure element are firmly arranged on the other one of the rigid element and the flexible element,
  the housing part of the first closure element and the housing part of the second closure element are arranged relative to each other such that the opening direction of the first closure element and the opening direction of the second closure element are directed against each other with at least one direction component, so that the flexible element is bent on opening, and
  in a non-bent condition of the flexible element the housing parts are spaced such that for closing they are brought into a position opposite the plug parts and snap into place with the same by moving in the closing direction.

2. The fastening arrangement according to claim 1, wherein that on opening, the flexible element is bent between the two housing parts and the two housing parts move towards each other.

3. The fastening arrangement according to claim claim 1, wherein the magnetic means on each closure element are realized by a first magnet arranged on the plug part and a second magnet arranged on the housing part, which for closing produce a force of magnetic attraction in closing direction between the plug part and the housing part and in the closed position of the respective closure element oppose each other in an attracting manner.

4. The fastening arrangement according to claim claim 1, wherein the catch and the magnetic means are adjusted such that the force of magnetic attraction is at least so large that for closing purposes the plug part automatically gets in engagement with the catch.

5. The fastening arrangement according to claim claim 1, wherein the magnetic means of the first closure element and of the second closure element are polarized such that between the plug part of the first closure element and the housing part of the second closure element, when the same are moved towards each other, a force of magnetic repulsion acts.

6. The fastening arrangement according to claim 1, wherein the opening direction of the first closure element and the opening direction of the second closure element are directed antiparallel to each other.

7. The fastening arrangement according to claim 1, wherein when the fastening arrangement additionally includes one or more further closure elements, the opening directions of all closure elements are aligned with a common center.

8. The fastening arrangement according to claim 1, wherein the closing direction of the first closure element and the closing direction of the second closure element are directed parallel to each other and vertical to a plane in which the opening direction of the first closure element and the opening direction of the second closure element extend.

9. The fastening arrangement according to claim 1, wherein the plug parts of the first closure element and of the second closure element are firmly arranged on the rigid element and the housing parts of the first closure element and of the second closure element are firmly arranged on the flexible element.

10. The fastening arrangement according to claim 1, wherein the rigid element is a helmet, in particular a ski helmet, and the flexible element is a pair of glasses or a visor.

11. The fastening arrangement according to claim 10, wherein the flexible element is formed curved in the form of the glasses or the visor with a first end and a second end and an edge portion extending between the first end and the second end, wherein the first closure element is arranged at the first end, the second closure element at the second end and a third closure element at the edge portion between the first end and the second end.

12. The fastening arrangement according to claim 1, further comprising a display means for indicating whether or not the first closure element and/or the second closure element is in the closed position.

13. The fastening arrangement according to claim 12, wherein the display means includes an electronic magnetic field sensor, in particular a reed switch, which when transferring the first and/or the second closure element into the closed position is actuated due to an interaction with the magnetic means and is connected with a measuring means for evaluating a switching condition of the reed switch.

14. The fastening arrangement according to claim 12, wherein the display means comprises a movable component which when transferring the first and/or the second closure element into the closed position is actuated due to an interaction with the magnetic means for indicating whether or not the first closure element and/or the second closure element is in the closed position.

15. A fastening arrangement for fastening a flexible element to a rigid element, comprising a first closure element and a second closure element which each consists of a plug part, a housing part and a catch arranged on the housing part, wherein
    each closure element is closed in that the plug part is put together with the housing part in a closing direction until the plug part snaps into place with the catch on the housing part in a closed position, so that the plug part and the housing part are held at each other against the closing direction via the catch,
    each housing part is formed such that by means of a relative movement of the housing part relative to the in an opening direction which differs from the closing direction the plug part is pushed out of the catch and the closure element hence can be opened,
    the plug part of the first closure element and the plug part of the second closure element are firmly arranged on the one of the rigid element and the flexible element, and the housing part of the first closure element and the housing part of the second closure element are firmly arranged on the other one of the rigid element and the flexible element,
    the housing part of the first closure element and the housing part of the second closure element are arranged relative to each other such that the opening direction of the first closure element and the opening direction of the second closure element are directed against each other with at least one direction component, so that the flexible element is bent on opening,
    in a non-bent condition of the flexible element the housing parts are spaced such that for closing they are brought into a position opposite the plug parts and snap into place with the same by moving in the closing direction, and
    wherein the catch of each closure element is formed by a catch spring arranged on the housing part, with which the associated plug part can latchingly be brought in engagement by attaching the same in the closing direction.

16. The fastening arrangement according to claim 15, wherein the catch spring includes a catch spring protrusion and the plug part includes an engaging protrusion, wherein in the closed position of each closure element the catch spring protrusion of the catch spring and the engaging protrusion of the plug part are positively in engagement with each other such that the plug part is held at the catch spring against the closing direction.

17. The fastening arrangement according to claim 15, wherein the catch spring is formed as ring segment, in the closed position engages around a trunnion of the plug part in a circumferential direction around the closing direction and circumferentially is opened through an opening, so that for opening the closure element the housing part is movable relative to the plug part in the opening direction together with the catch spring arranged thereon.

18. The fastening arrangement according to claim 15, wherein the catch spring of the first closure element and the catch spring of the second closure element each are arranged in a recess of the associated housing part, wherein in the closed position in the non-bent condition of the flexible element the distance between the catch spring of the first closure element and the catch spring of the second closure element corresponds to the distance between the plug part of the first closure element and the plug part of the second closure element.

19. The fastening arrangement according to claim 18, wherein for opening each closure element by the relative movement of the housing part to the plug part in the opening direction, the plug part is shifted in the recess of the housing part.

20. A fastening arrangement for fastening a flexible element to a rigid element, comprising a first closure element and a second closure element which each consists of a plug part, a housing part and a catch arranged on the housing part, wherein
    each closure element is closed in that the plug part is put together with the housing part in a closing direction until the plug part snaps into place with the catch on the housing part in a closed position, so that the plug part and the housing part are held at each other against the closing direction via the catch,
    each housing part is formed such that by means of a relative movement of the housing part relative to the plug part in an opening direction, which differs from the closing direction, the plug part is pushed out of the catch and the closure element hence can be opened,
    the plug part of the first closure element and the plug part of the second closure element are firmly arranged on the one of the rigid element and the flexible element, and the housing part of the first closure element and the housing part of the second closure element are firmly arranged on the other one of the rigid element and the flexible element,
    the housing part of the first closure element and the housing part of the second closure element are arranged relative to each other such that the opening direction of the first closure element and the opening direction of the second closure element are directed against each other with at least one direction component, so that the flexible element is bent on opening,
    in a non-bent condition of the flexible element the housing parts are spaced such that for closing they are brought into a position opposite the plug parts and snap into place with the same by moving in the closing direction, and
    wherein the rigid element is a vehicle floor and the flexible element is a floor mat of a vehicle.

21. The fastening arrangement according to claim 20, wherein the housing part of each closure element is arranged on the flexible element at an opening provided for the same, wherein the housing part reaches through the opening and is connected with a lid, and wherein the housing part and the lid each reach over the edge of the opening with an edge portion, so that the housing part is held at the flexible element.

* * * * *

UNITED STATES PATENT AND TRADEMARK OFFICE
CERTIFICATE OF CORRECTION

PATENT NO. : 9,096,148 B2  
APPLICATION NO. : 13/522418  
DATED : August 4, 2015  
INVENTOR(S) : Joachim Fiedler It is certified that error appears in the above-identified patent and that said Letters Patent is hereby corrected as shown below:

In the Claims

Column 14, Line 20, Claim 3, before "claim 1," delete "claim".

Column 14, Line 28, Claim 4, before "claim 1," delete "claim".

Column 14, Line 33, Claim 5, before "claim 1," delete "claim".

Column 15, Line 25, Claim 15, delete "element" and insert -- element, --.

Column 15, Line 35, Claim 15, after "to the" insert -- plug part --.

Column 15, Lines 35-36, Claim 15, delete "opening direction" and insert -- opening direction, --.

Column 15, Line 36, Claim 15, delete "closing direction" and insert -- closing direction, --.

Column 16, Line 29, Claim 20, delete "element" and insert -- element, --.

Signed and Sealed this  
Twenty-first Day of June, 2016

Michelle K. Lee  
*Director of the United States Patent and Trademark Office*